Figure 1:
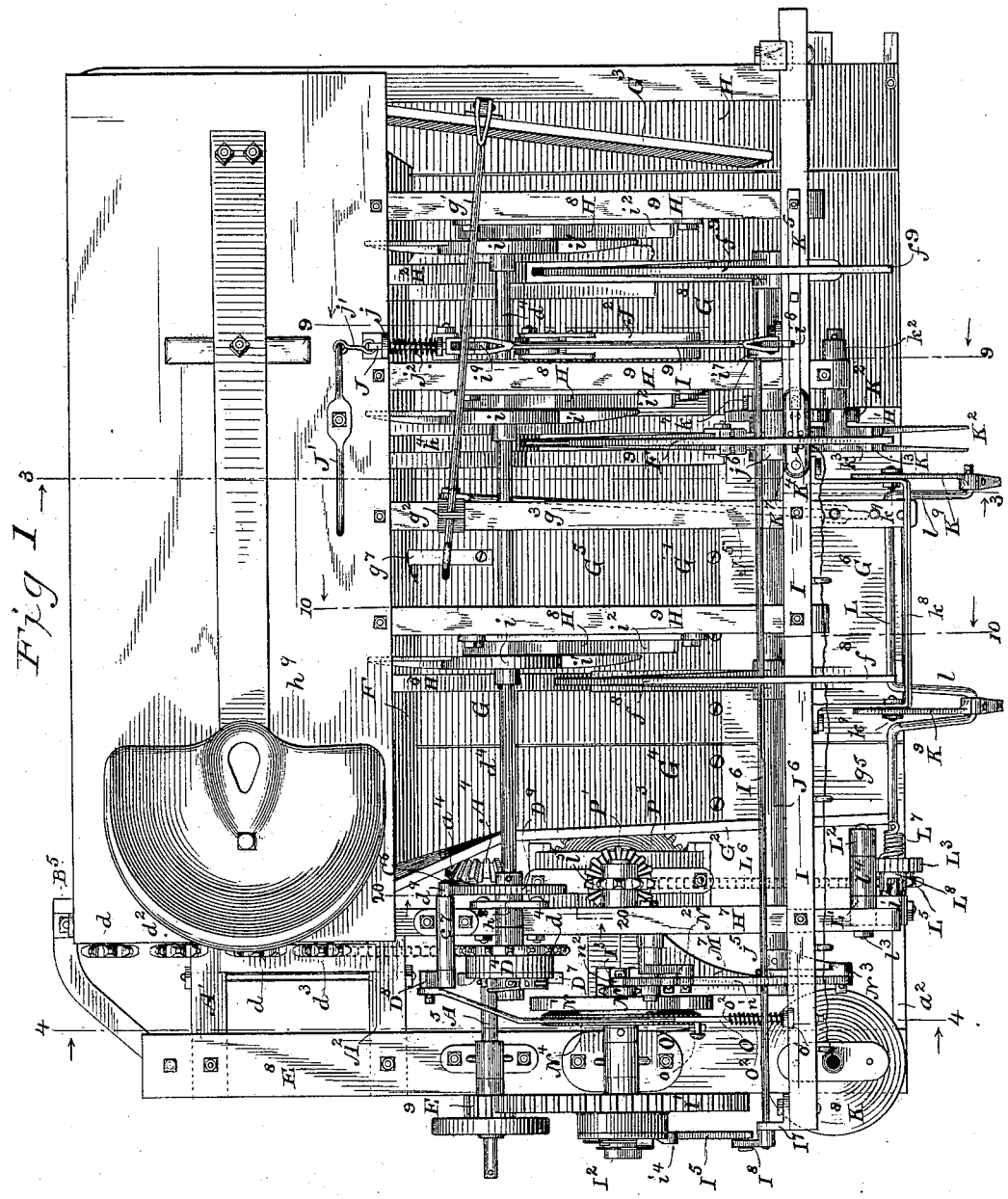

(No Model.)

13 Sheets—Sheet 1.

W. P. HALE.
GRAIN BINDER.

No. 343,709. Patented June 15, 1886.

Witnesses
Wm A Sinkle
Geo W Young

Inventor
William P. Hale.
By his Attorneys
Baldwin, Hopkins & Peyton.

(No Model.) 13 Sheets—Sheet 2.
W. P. HALE.
GRAIN BINDER.

No. 343,709. Patented June 15, 1886.

Witnesses
Wm A. Skinkle.
Geo. W. Young.

Inventor
William P. Hale.
By his Attorneys
Baldwin, Hopkins & Peyton.

(No Model.) 13 Sheets—Sheet 3.

W. P. HALE.
GRAIN BINDER.

No. 343,709. Patented June 15, 1886.

Witnesses
Wm A. Skinkle
Geo W. Young

Inventor
William P. Hale.
By his Attorneys
Baldwin, Hopkins & Peyton.

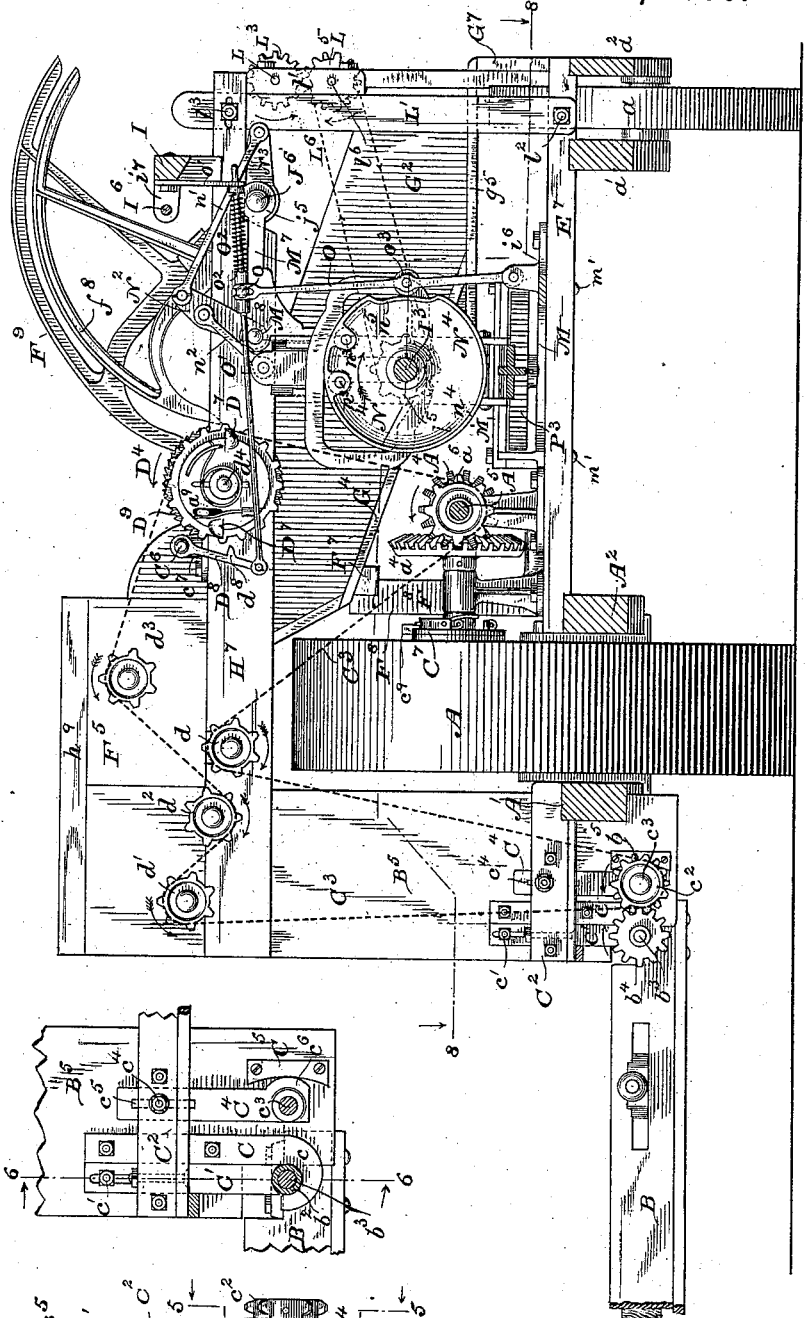

(No Model.) 13 Sheets—Sheet 5.
W. P. HALE.
GRAIN BINDER.
No. 343,709. Patented June 15, 1886.
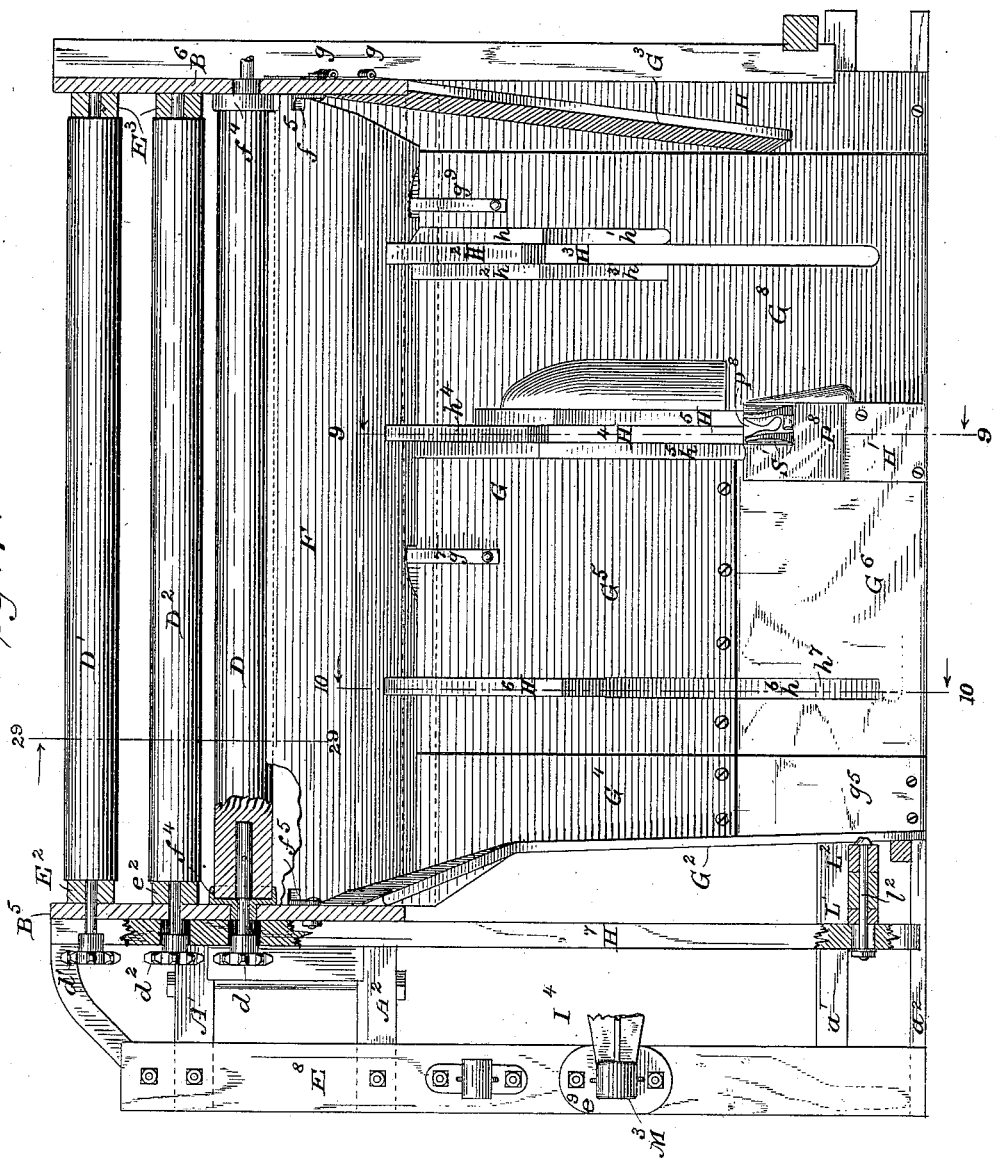
Witnesses
Wm. A. Skinkle
Geo. W. Young
Inventor
William P. Hale.
By his Attorneys
Baldwin, Hopkins & Peyton.

(No Model.)  
13 Sheets—Sheet 6.

W. P. HALE.
GRAIN BINDER.

No. 343,709. Patented June 15, 1886.

Witnesses  
Wm A Skinkle  
Geo W. Young

Inventor  
William P. Hale.  
By his Attorneys  
Baldwin, Hopkins & Peyton.

(No Model.)
13 Sheets—Sheet 7.
W. P. HALE.
GRAIN BINDER.
No. 343,709.  Patented June 15, 1886.
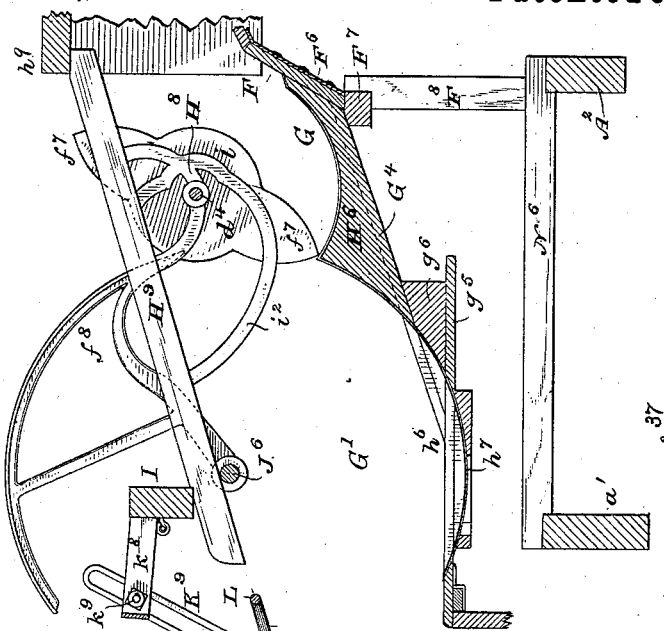
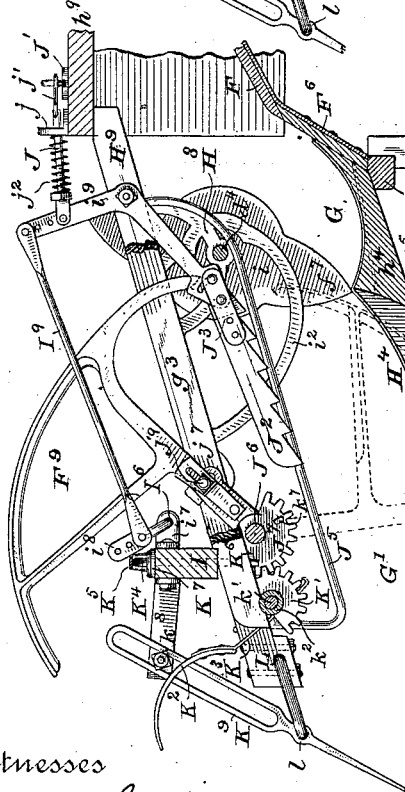
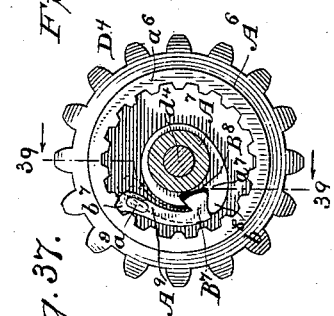
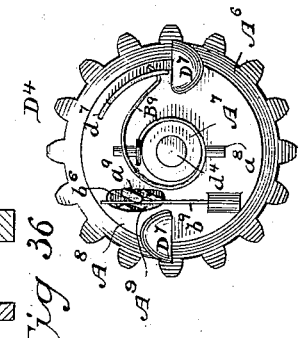
Witnesses
Wm A. Skinkle
Geo W Young
Inventor
William P Hale
By his Attorneys
Baldwin, Hopkins & Peyton (No Model.) 13 Sheets—Sheet 8.
W. P. HALE.
GRAIN BINDER.
No. 343,709. Patented June 15, 1886.
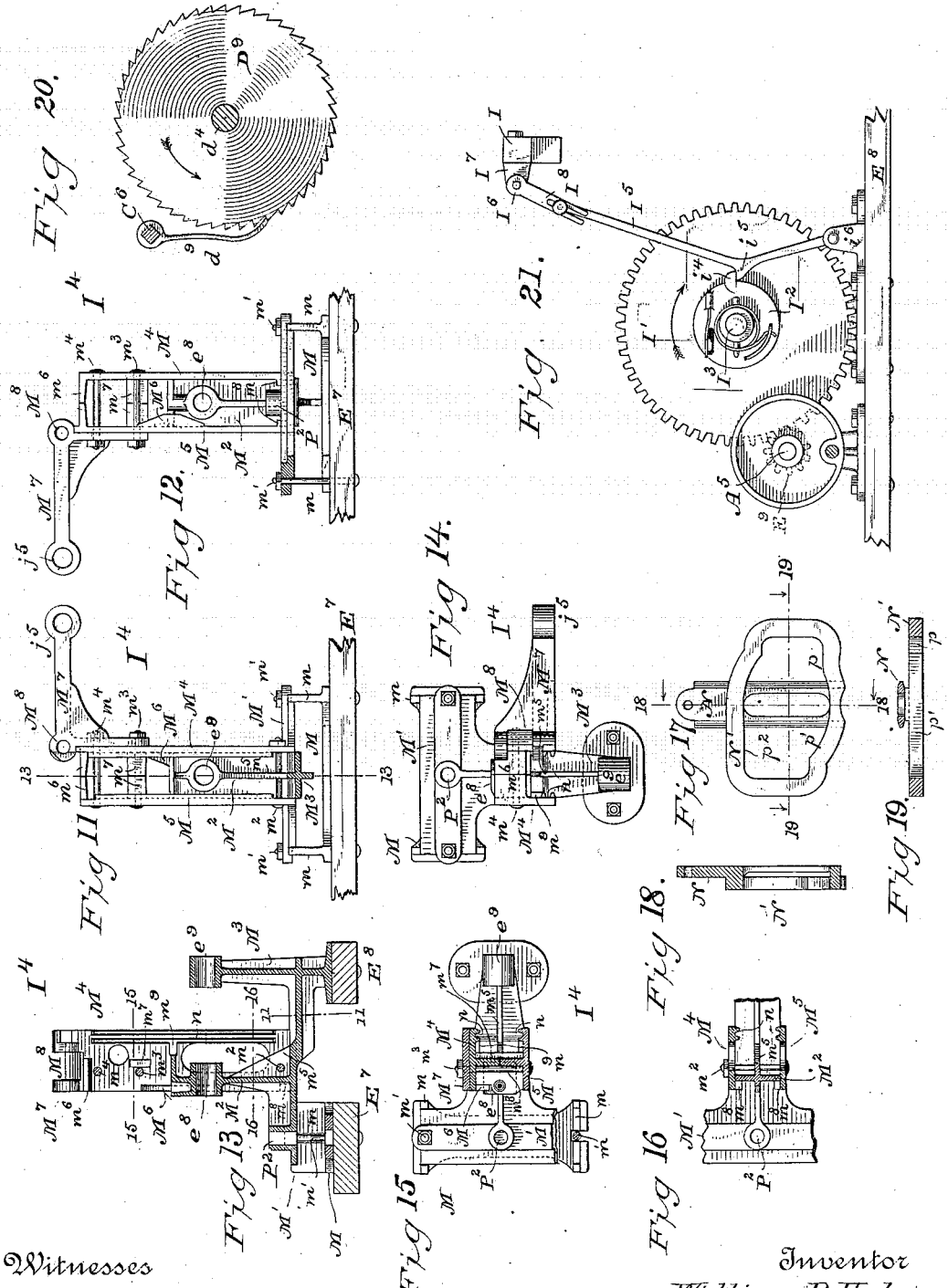
Witnesses
Wm A. Skinkle
Geo. W. Young
Inventor
William P. Hale
By his Attorneys
Baldwin, Hopkins & Peyton (No Model.) 13 Sheets—Sheet 9.

W. P. HALE.
GRAIN BINDER.

No. 343,709. Patented June 15, 1886.

Witnesses
Wm A. Skinkle
Geo W. Young

Inventor
William P. Hale,
By his Attorneys
Baldwin, Hopkins & Peyton

N. PETERS, Photo-Lithographer, Washington, D. C.

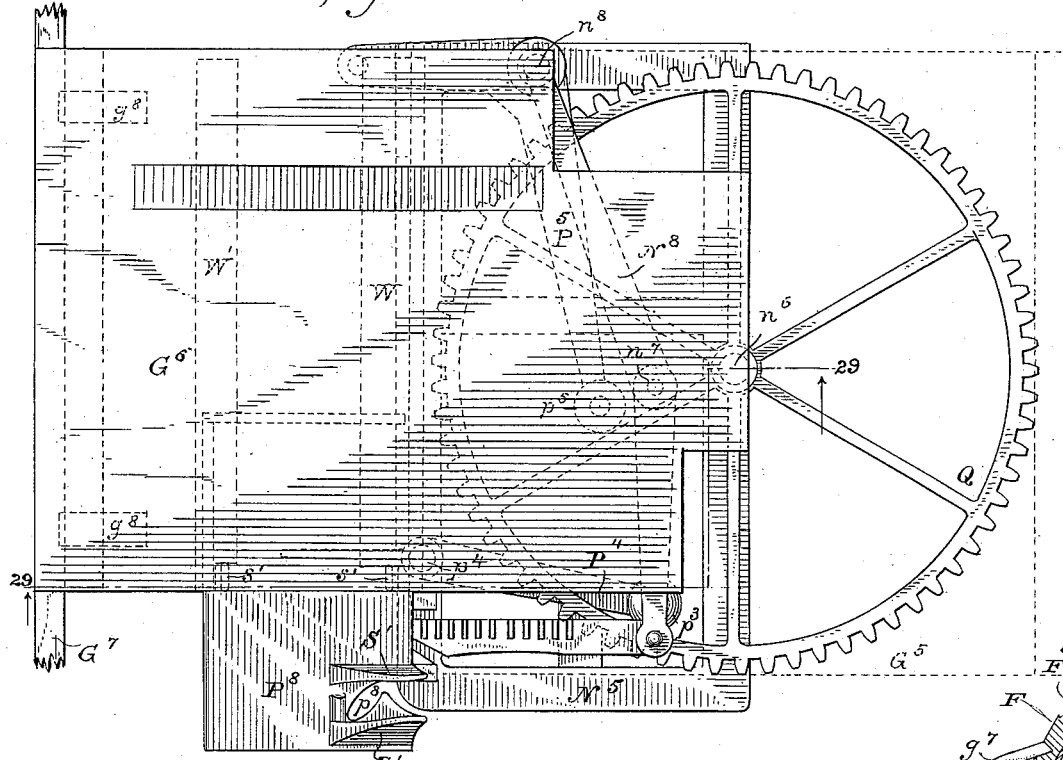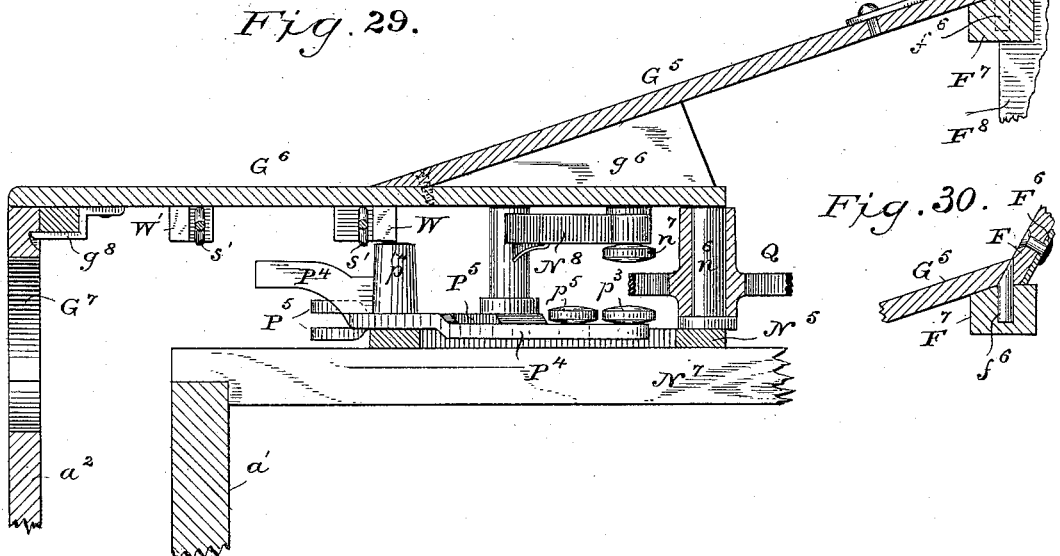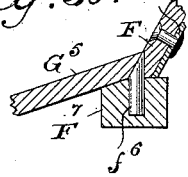

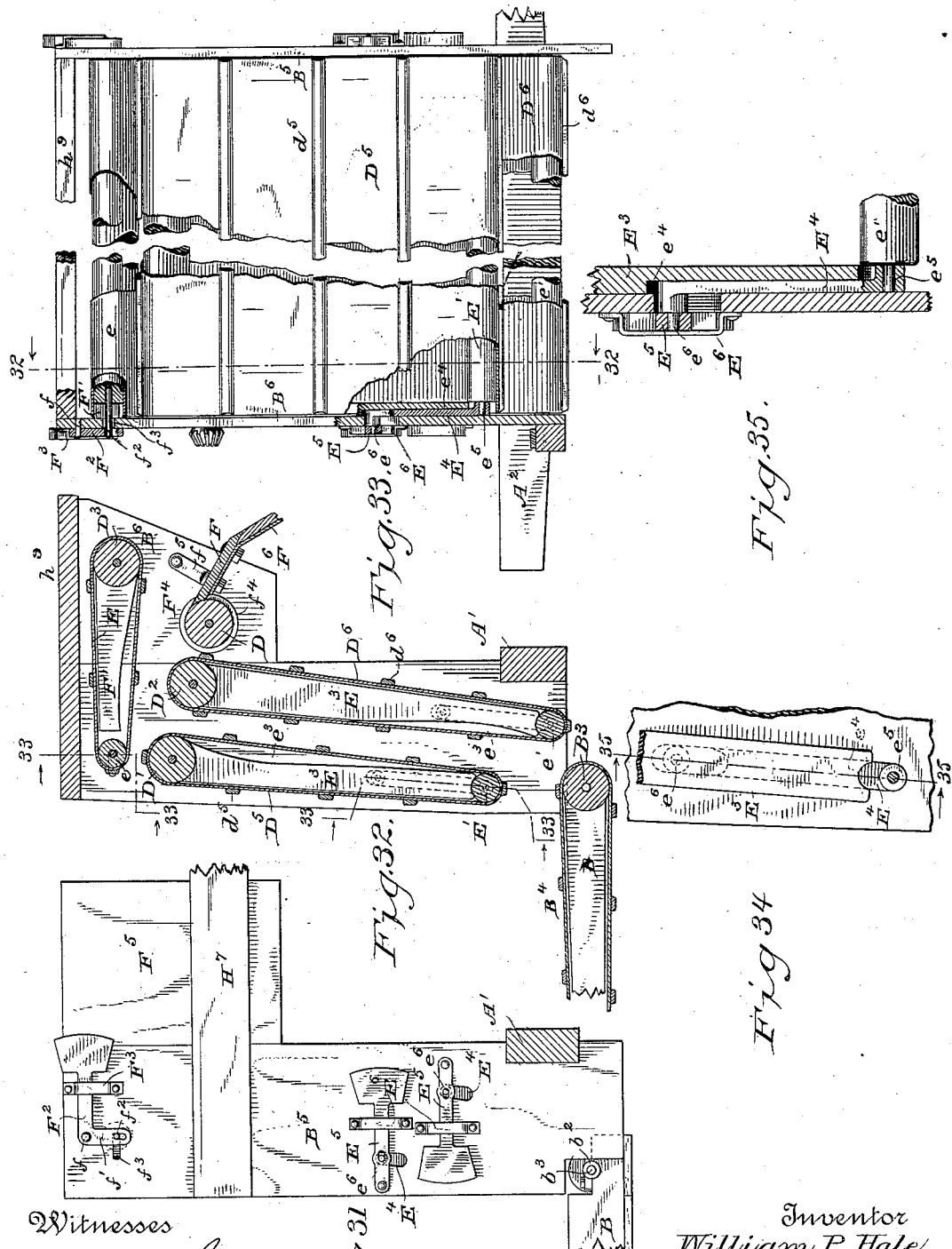

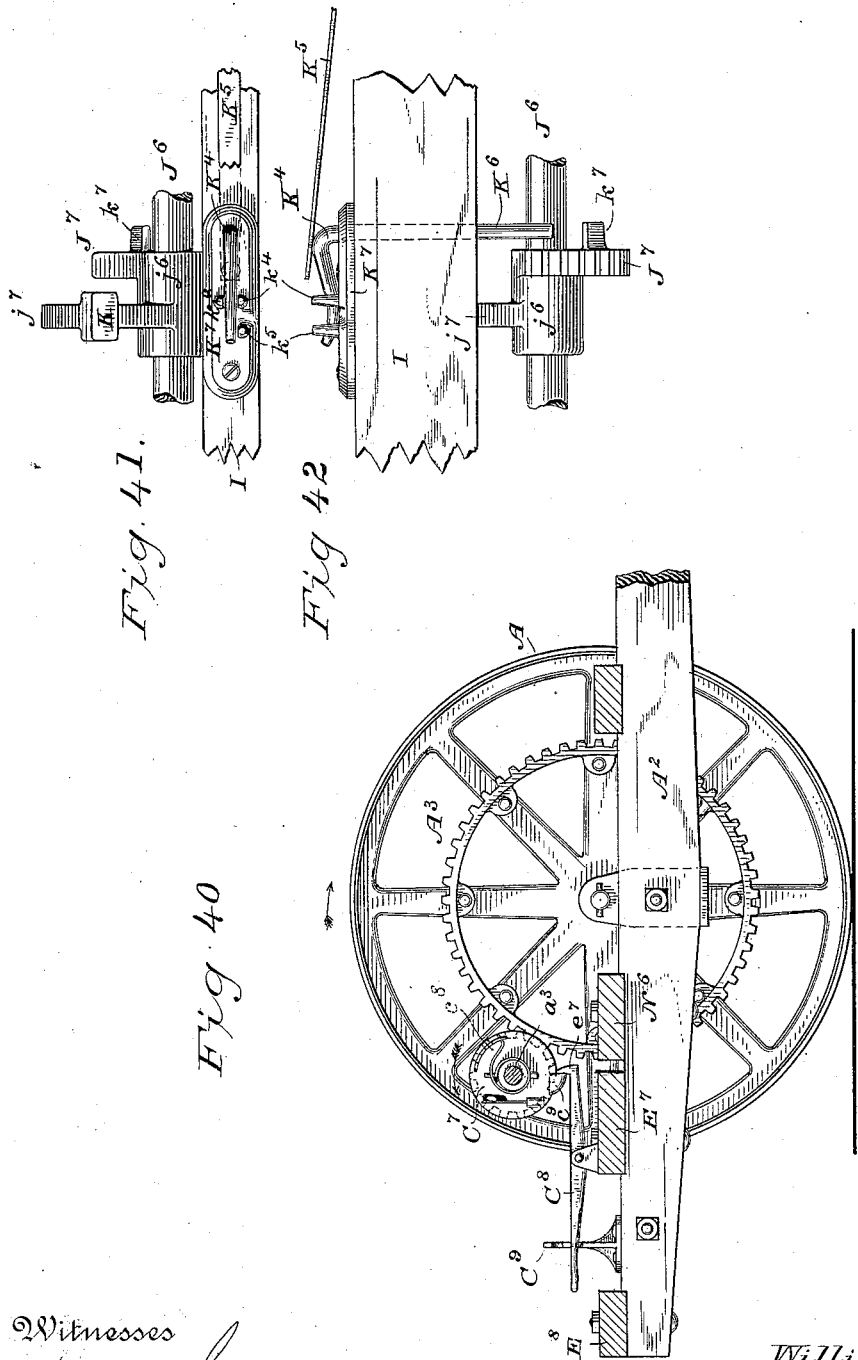

(No Model.) W. P. HALE. 13 Sheets—Sheet 13.
GRAIN BINDER.

No. 343,709. Patented June 15, 1886.

Witnesses
Wm A Skinkle
Geo. W. Young

Inventor
William P. Hale
By his Attorneys,
Baldwin, Hopkins & Peyton

N. PETERS, Photo-Lithographer, Washington, D. C.

United States Patent Office.

WILLIAM P. HALE, OF BROCKPORT, NEW YORK.

GRAIN-BINDER.

SPECIFICATION forming part of Letters Patent No. 343,709, dated June 15, 1886.

Application filed November 26, 1884. Serial No. 148,873. (No model.)

*To all whom it may concern:*

Be it known that I, WILLIAM P. HALE, of Brockport, in the county of Monroe and State of New York, have invented certain new and useful Improvements in Grain-Binders, of which the following is a specification.

My invention relates to improvements, hereinafter distinctly claimed, applicable to harvesters of the class in which the main frame is carried by two supporting-wheels, the grain-platform and cutting apparatus have jointed connection with the main frame, and the grain to be bound is carried over the inner supporting or driving wheel.

My invention involves improvements in means for elevating the grain from the grain-platform, conducting it to the binding-receptacle, gaveling or packing and binding it, and discharging bound bundles.

In some respects devices shown in connection with my present invention are the same as or generally similar to features set forth in United States Letters Patent Nos. 267,521 and 325,208, granted to me November 14, 1882, and August 25, 1885.

The accompanying drawings show my improvements in connection with those parts of an appropriate harvester, illustration of which is needed to convey a proper understanding of a suitable application of my invention.

Figure 2:
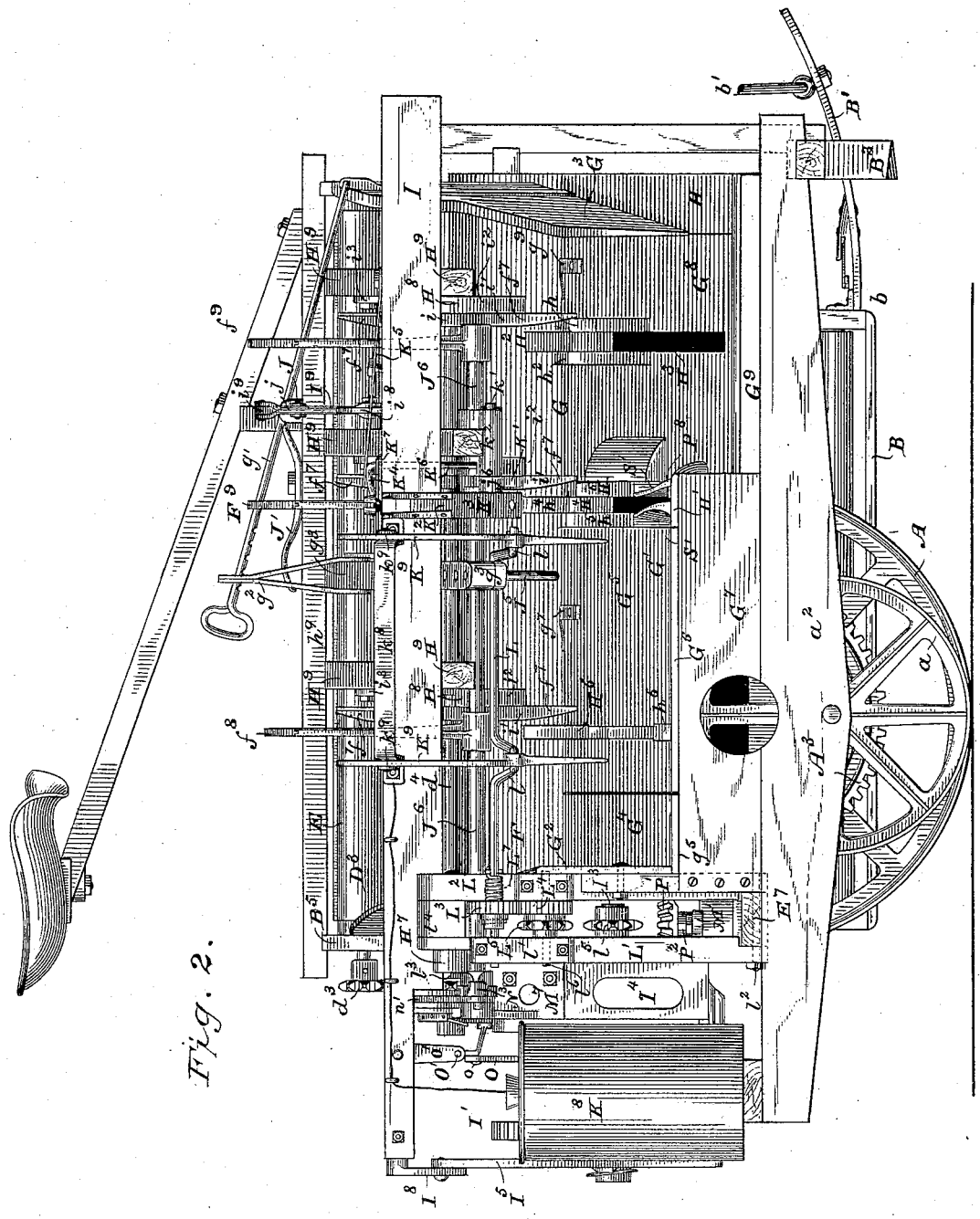
Figure 3:
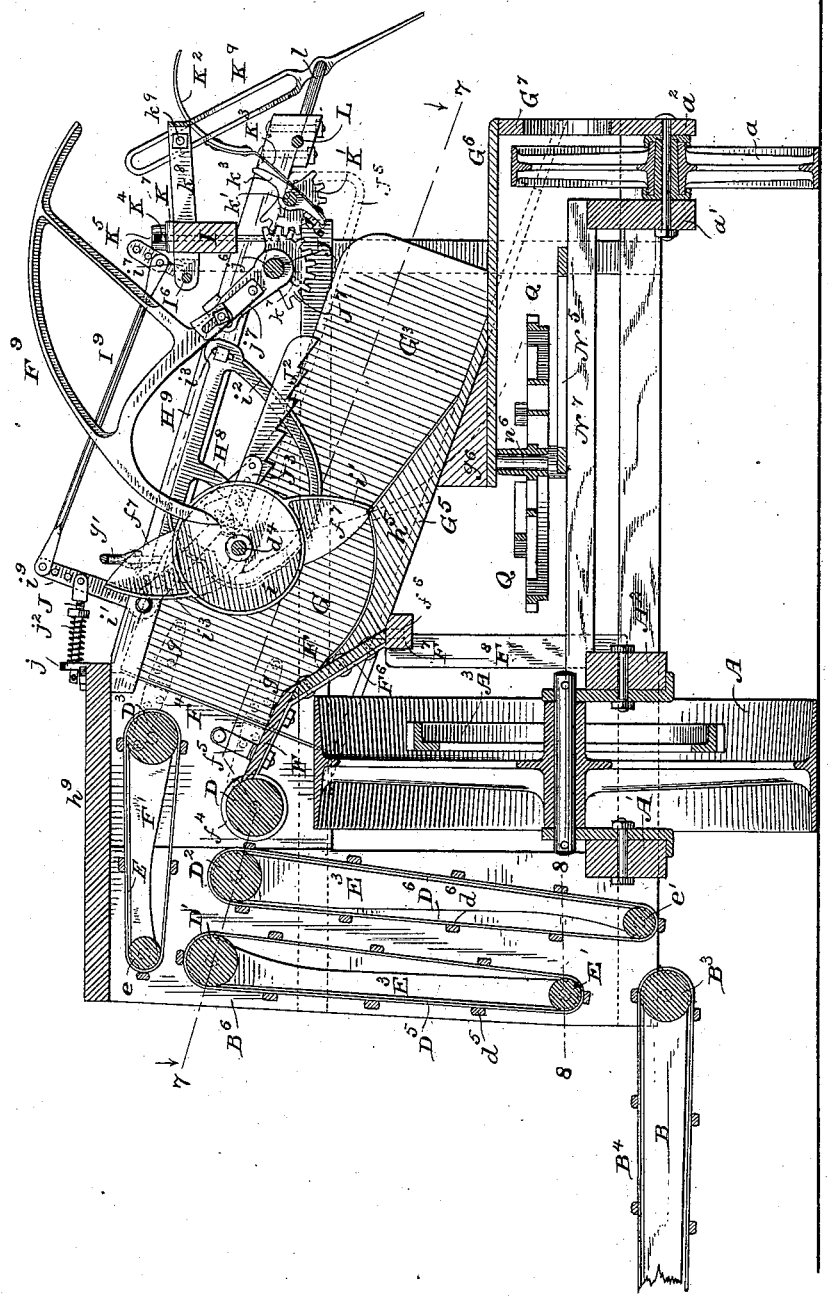
Figure 8:
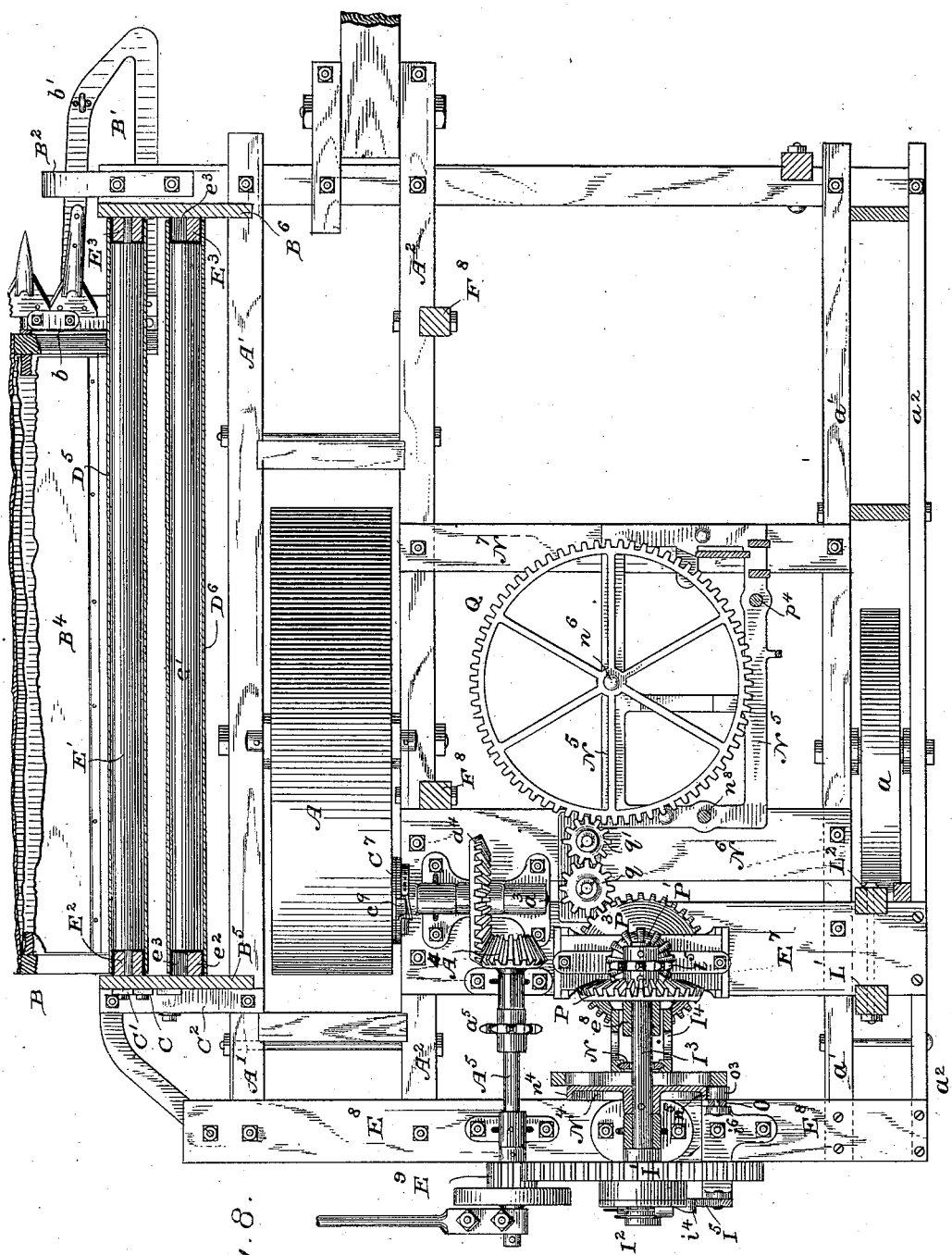
Figure 22:
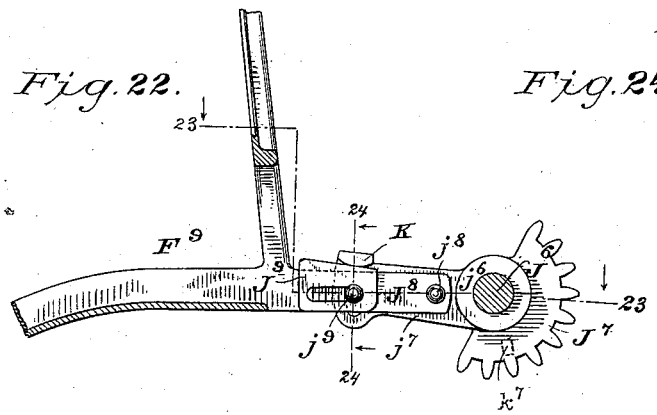
Figure 24:
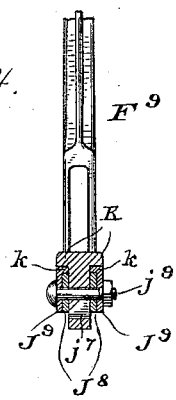
Figure 23:
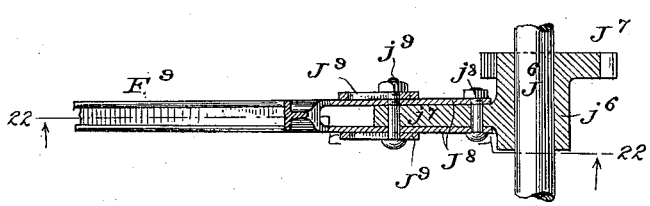
Figure 25:
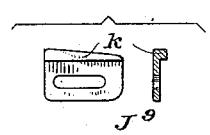
Figure 26:
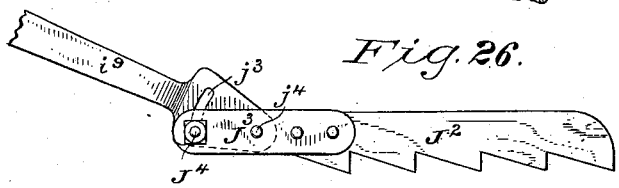
Figure 27:
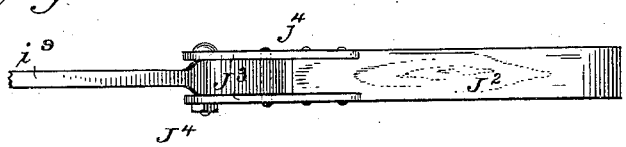
Figure 45:
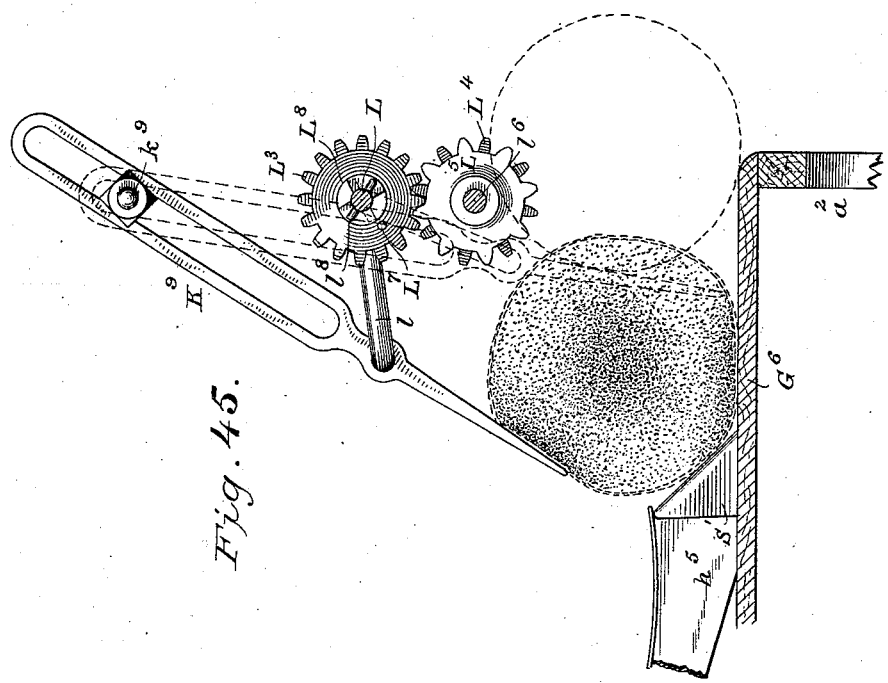
Figure 43:
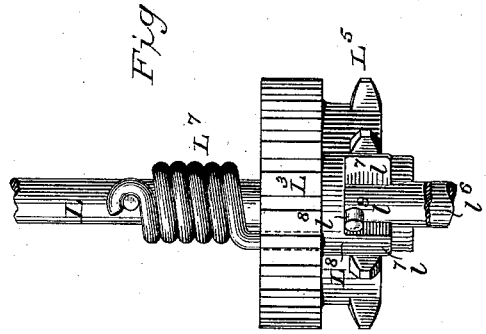
Figure 44:
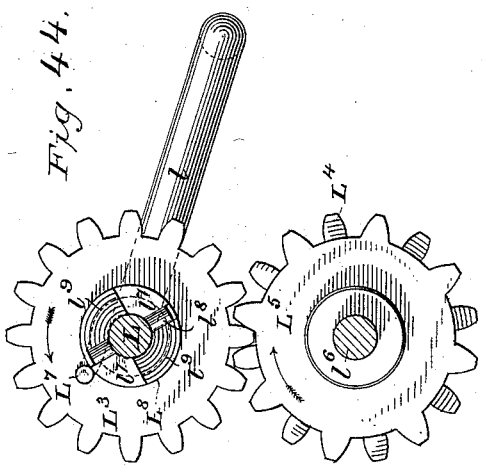

Figure 1 is a plan view of the binding mechanism and the main frame, with parts omitted. Fig. 2 is a view in elevation, as seen from the outer or stubble side. Fig. 3 is a view, partly in rear elevation and partly in section, on the line 3 of Fig. 1. Fig. 4 is a view, partly in rear elevation and partly in section, on the line 4 of Fig. 1. Fig. 5 is a view, partly in rear elevation and partly in section, on the line 5 of Fig. 6, showing details of the connection between the main frame and grain-platform at rear; and Fig. 6 is a view, partly in side elevation and partly in section, on the line 6 of Fig. 5. Fig. 7 is a view, partly in plan and partly in section, above the plane of the binding-receptacle, on the line 7 of Fig. 3, with portions of the binding mechanism omitted. Fig. 8 is a view, partly in plan and partly in section, on the lines 8 of Figs. 3 and 4. Fig. 9 is a view, partly in front elevation and partly in section, on the lines 9 of Figs. 1 and 7, in different planes. Fig. 10 is a view, partly in front elevation and partly in section, on the lines 10 of Figs. 1 and 7. Figs. 11 to 16, inclusive, are views showing details of a sectional bracket-frame for supporting mechanism for actuating the binding mechanism. Of these views Fig. 11 is a rear elevation, partly in section, on the line 11 of Fig. 13; Fig. 12, a front elevation, a portion being broken away; Fig. 13, a view, partly in side elevation and partly in section, on the line 13 of Fig. 11; Fig. 14, a plan view; Fig. 15, a plan view, partly in section, on the line 15 of Fig. 13, a portion being broken away; Fig. 16, a view, partly in plan and partly in section, on the line 16 of Fig. 13. Figs. 17, 18, and 19 show details of a vertically-reciprocating cam for actuating the binder-arm. Of these views Fig. 17 is a rear elevation; Fig. 18, a vertical section on the line 18 of Fig. 17, and Fig. 19 a horizontal section on the line 19 of Fig. 17. Fig. 20 is a view, partly in rear elevation and partly in section, on the line 20 of Fig. 1, showing means for preventing rebound or backward turn of the packer. Fig. 21 is a view showing a rear elevation of the main actuating-gear of the binding mechanism, and the clutch mechanism for throwing said gear into and out of engagement with its shaft. Fig. 22 is a view, partly in rear elevation and partly in section, on the line 22 of Fig. 23, showing means for adjusting the binder-arm relatively to its shaft. Fig. 23 is a view, partly in plan and partly in section, on the line 23 of Fig. 22. Fig. 24 is a view, partly in elevation and partly in section, on the line 24 of Fig. 22. Fig. 25 shows in elevation, as seen from the inner side, and in vertical transverse section, one of the adjusting wedge-clips of the binder-arm. Figs. 26 and 27 are detail view, showing, respectively, a rear elevation and a plan of part of a tripping-lever or starting-arm, and the means for adjusting the outer section or head thereof, by the pressure upon which of the grain the actuating mechanism of the binding mechanism is thrown into operation. Fig. 28 is a plan view with some parts represented by dotted lines, showing portions of the knotter-actuating mechanism and a portion of a detachable section of the binding receptacle, by which parts of the knotting-machanism are held in place and covered. Fig. 29 is a view, partly in front elevation and partly in section, on the lines 29 of Figs. 7 and 28, showing the manner of securing the detachable section of the binding-receptacle in place. Fig. 30 is a detail sectional view showing the manner in which the lower edge of the pitch-board is supported and held in place. Figs. 31 to 35, inclusive, are views representing details of the apparatus by which the grain is elevated and conducted toward the binding-receptacle and delivered to the packer. Of these views, Fig. 31 is a rear elevation showing that portion of the main frame in which the rear journals of the rollers of the elevating and delivering aprons are mounted, and the weighted levers, which are connected with some of these journals for stretching the aprons; Fig. 32, a view, partly in rear elevation and partly in section, on the line 32 of Fig. 33; Fig. 33, a view, partly in side elevation and partly in section, on the lines 33 of Fig. 32, with some portions broken away; Fig. 34, an elevation on an enlarged scale, partly in section, on the line 34 of Fig. 35; and Fig. 35 a view, partly in elevation and partly in section, on the line 35 of Fig. 34, showing the manner of adjustably supporting one end of one of the rollers of an elevating-apron. Figs. 36 to 39, inclusive, show a clutch of the packer-shaft. Of these views Fig. 36 is a rear elevation; Fig. 37, a section on the line 37 of Fig. 38; Fig. 38, a plan view with parts broken away, and Fig. 39 a section on the line 39 of Fig. 37. Fig. 40 is a view in elevation, with the main frame partially represented in section, showing means for throwing the actuating mechanism of the binding mechanism into and out of gear with the main driving-wheel. Figs. 41 and 42 are respectively a plan view and a side elevation, showing details of the tension mechanism. Figs. 43, 44, and 45 are views showing details of ejecting mechanism for discharging the bound bundles of grain. Of these views, Fig. 43 is a plan, with parts broken away; Fig. 44, a rear elevation with parts in section and other parts omitted; and Fig. 45 a diagram showing a rear elevation of portions of the mechanism, with parts in section, designed to represent the manner in which the ejector-fingers act upon the bundles.

A suitably-constructed main frame is supported upon two wheels—one a main or driving-wheel, A, and the other a smaller or supplemental wheel, $a$—the axles of the respective wheels being mounted in a line with each other in the parallel inner bars, $A'$ $A^2$, and outer bars, $a'$ $a^2$, of the main frame.

Motion is imparted to a primary driving-shaft, $a^3$, from the driving and main supporting-wheel, A, by the usual internal gear, $A^3$, meshing with a pinion on the shaft. This shaft is engaged by a bevel-gear, $A^4$, and a corresponding pinion, $a^4$, with a main actuating driven shaft, $A^5$.

Clutch mechanism for throwing the primary driving-shaft into and out of gear with the driving-wheel is provided.

The main actuating-shaft $A^5$ projects beyond the main frame at rear, and is provided with a crank, to which is attached the pitman for operating the cutters.

A suitable grain-platform, B, supported at its outer end by the usually-provided grain-wheel, (not shown,) the axle of which is directly in line with the axles of the main and supplemental supporting-wheels A $a$, and a finger-beam, $b$, rigidly secured to the platform, have jointed connection with the main frame, and provision is made for rocking the platform and finger-beam to tilt the guards.

The means employed for making the jointed connection of the grain-platform and the finger-beam of the cutting apparatus with the main frame and the devices for tilting the guards are in most respects the same as fully set forth in my before-mentioned Patent No. 325,208, a branching or skeleton-like shoe, $B'$, a loop-like guideway-bracket, $B^2$, for this shoe, rigidly secured to the inner front corner of the main frame, and a link-rod, $b'$, jointed to the shoe, being employed as before in connection with devices shown and described in said patent, and needing no description here. As in this instance shown, the jointed connection of the cutting apparatus and grain-platform with the main frame, while allowing of their vertical vibration independently of the movements of the main frame, does not allow of folding them up against the frame, and the details of the jointed connection of the grain-platform with the main frame at or near its inner rear corner, (see Figs. 4, 5, and 6,) instead of being as before, are in some respects different, and (to the extent to which detailed description is here needed) are as follows: The back beam of the grain-platform has a bearing-sleeve, $b^2$, firmly secured to its cut-away inner end by side lugs and bolts, and the rear journal, $b^3$, of the driving-roller $B^3$ of the endless carrier $B^4$ of the grain-platform passes through this bearing-sleeve, and has a pinion, $b^4$, secured to it. The bearing-sleeve is pivotally connected with a rear upright bar, $B^5$, of the main frame in such manner that, while the rear inner corner of the grain-platform is supported by the main frame, the platform and cutting apparatus may be allowed vertical vibration to the needed extent without interfering with proper operation of the endless carrier. The pivotal supporting connection of the bearing-sleeve $b^2$ with the main frame is by means of a sectional bearing consisting of a hanger, C, firmly bolted to the frame-upright $B^5$, and in the hooked lower end or half-bearing, $c$, of which the bearing-sleeve rests, and a vertically-movable upper bearing-section, formed by a rod, $C'$, having the recessed lower end to fit over the bearing-sleeve and hold it in place in the lower section. The upper section of the bearing is rendered vertically adjustable, so that it may be moved to provide for the insertion and removal of the sleeve-bearing. The adjustment of this bearing-section is provided for by slotting it longitudinally, employing the securing-bolt $c'$ and its nut, and forming a guideway for the bearing-rod $C'$ in a cleat, $C^2$, secured to the frame-upright, as will readily be understood from the drawings. A carrier-actuating pinion, $b^5$, engaging the pinion $b^4$ of the driving-roller of the endless carrier of the grain-platform, is formed with or rigidly secured to a sprocket-pulley, $c^2$, driven by a chain, $C^3$, (see dotted lines, Fig. 4,) and rotating with the actuating-pinion, with which it is mounted on a stud-shaft, $c^3$, carried by a rod, $C^4$, which is adjustable, to provide for tightening the driving-chain. A securing bolt and nut, $c^4$, and a slot, $c^5$, in the rod $C^4$ provide for adjusting it vertically, as will readily be understood.

In order that the carrier-actuating pinion throughout its adjustment may be held in proper engagement with the pinion of the carrier-roller, a rounded knob or side projection, $c^6$, is formed at the lower end of the adjusting-rod $C^4$, to bear against a guide, $C^5$, shown as formed by a block secured to the frame upright and suitably curved on its surface, against which the adjusting-rod bears.

The main actuating-shaft $A^5$, by connections with which the various operating parts of the mechanism are actuated, imparts motion to the driving-chain $C^3$ by means of the sprocket-pulley $a^5$. In addition to its function of operating the carrier-actuating pinion $b^5$ by engagement with its sprocket-pulley $c^2$, this driving-chain serves as the connection by which grain elevating and conducting apparatus and packing mechanism, in turn to be described in detail, are operated from the main actuating-shaft in the following way: The driving-chain passes from the pulley $a^5$ of the main actuating-shaft over a sprocket-pulley, $d$, secured to the rear journal of a clearing roller, D, forming part of the grain-conducting apparatus, then downward and beneath the pulley of the carrier-actuating pinion, then upward and over a sprocket-pulley, $d'$, fast on the rear journal of the upper or driving-roller, $D'$, of one of the endless aprons of the grain-elevating apparatus, then beneath the sprocket-pulley $d^2$ of the driving-roller $D^2$ of the other endless apron of the grain-elevating apparatus, then over a sprocket-pulley, $d^3$, secured to the rear journal of the driving-roller $D^3$ of a horizontally-extending grain-conducting apron, E, above the elevating apparatus and clearing-roller, then over a sprocket-pulley, $D^4$, loose on an intermittingly-actuated shaft, $d^4$, of the packing mechanism, and having clutch-connection with this shaft, and next back to the pulley $a^5$.

The two endless aprons $D^5$ $D^6$ of the grain-elevating apparatus are alike, (two series of belts may obviously be employed in lieu of the aprons, each made in one piece, but are not deemed so well adapted to the work,) and are provided with the usually-employed cross-bars $d^5$ $d^6$. Space is economized by the vertical or nearly vertical arrangement of the elevating-aprons, as shown. The outer apron, $D^5$, is arranged over and about in the vertical plane of the driving-roller $B^3$ of the platform-carrier, the lower or driven roller, $E'$, of this apron being sufficiently far above the roller $B^3$ to allow the grain to be properly directed by the platform-carrier to the elevating-aprons, so as to be carried up between them. The inner apron, $D^6$, is substantially parallel with the outer apron, and its lower or driven roller, $e'$, is located beneath the level of the corresponding roller of the outer apron, inside of the driving-roller of the platform-carrier, and with its axis in or about in the same horizontal plane as the upper surface of the carrier. The axis of the driving-roller $D'$ of the outer elevating-apron is at a slightly-higher level than the corresponding roller, $D^2$, of the inner apron in order that the grain may readily pass from the elevating apparatus in the direction of the binding mechanism. The driven roller $e$ of the conducting-apron E is located slightly above the driving-roller of the outer elevating-aprons, and the conducting-apron is provided with the usually-employed cross-bars, for engaging the grain and directing it toward the packing mechanism.

The conducting-apron may be composed of a series of narrow belts, if preferred, and instead of extending in a horizontal or substantially-horizontal direction, as shown, may be more or less inclined, and the elevating-aprons may also be more or less inclined, to suit the different circumstances under which the grain elevating and conducting apparatus may be employed. The conducting-apron is supported above or overhangs the elevating apparatus and the clearing-roller D, which is adjacent to an inclined way, which I designate a "pitch-board," F, along which the grain passes toward the packing mechanism. The clearing-roller, the function of which is to act on the grain as presented to it by the elevating apparatus, prevents grain being carried down at the back of the inner elevating-apron and directs the grain to the pitch-board, is located between the pitch-board and the driving-roller of the inner elevating-apron and rotates at but slight distance from this elevating-apron at one side, and close to the beveled upper edge of the pitch-board at the opposite side.

The rollers of the grain elevating and conducting apparatus are supported by the main frame in suitable bearings, and provision is made for applying tension to the aprons of the apparatus, while allowing them to yield to accommodate a pack of grain, to prevent clogging and insure proper working of the apparatus, as next to be described.

The rear journals of the driving-rollers $D'$ $D^2$ of the two elevating-aprons pass through the rear upright, $B^5$, of the main frame and through cleats $E^2$ $e^2$, secured to the upright. These journals may have their bearings in either the upright or the cleats, or in both. The cleats are lapped by the edges of the aprons, as shown, and clogging by entanglement of the grain at the ends of the rollers is thus prevented. These cleats extend downward between their respective aprons, terminating at their lower ends adjacent to the driven rollers of the aprons. The front journals of the driving-rollers have their bearings in the cleats $E^3 E^3$, secured between the edges of the respective aprons to the front upright, $B^6$, of the main frame. These cleats are recessed or cut away, as at $e^3 e^3$, and the cleats $E^2 e^2$ are similarly cut away, in order that the aprons may yield to widen the space between them and accommodate a pack of grain to avoid clogging, as will readily be understood. The front cleats, $E^3$, terminate at their lower ends adjacent to the driven rollers of the aprons, being in all respects the same as the rear cleats.

To keep the aprons taut or under proper tension, and yet admit of their yielding to avoid clogging, the driven rollers $E'$ and $e'$ are mounted at both ends in adjustable bearings acted upon by weights. As the adjusting devices are the same at each of the ends of the rollers, the following description of the devices at one end of one of the rollers will answer for all, corresponding letters of reference being used in designating similar parts of the respective devices. Each cleat between the edges of an elevating-apron is vertically grooved at and near its lower end, to form a guideway, $e^4$, at the inner side of the frame-upright, in which moves endwise an adjustable hanger, $E^4$, having a bearing, $e^5$, at its lower end, for the journal of the driven roller of the elevating-apron. At its upper end the bearing-hanger projects through a slot in the frame-upright, and is pivotally connected at the outer side of the upright with a weighted lever, $E^5$. The lever is provided with an elongated slot, to engage the pivot $e^6$ at the upper end of the bearing-hanger, and is weighted at one end, and pivoted to the frame-upright at its opposite end near its pivotal connection with the bearing-hanger. The lever moves in a guideway, $E^6$, as it vibrates. The operation is obvious. The driven roller $e$ of the conducting-apron is adjustably mounted in similar manner at its opposite ends in the frame-uprights $B^5 B^6$, and recessed cleats $F'$ (only one of which is shown) are provided between the apron-edges at front and rear. Description of the way of mounting the roller $e$ at one end only is required. A weighted angular or elbow lever, $F^2$, provided with a guideway, $F^3$, is pivoted at $f$ to the frame-upright, by which it is supported, and its downwardly-projecting short arm $f'$ is provided with an elongated slot for engaging the roller-journal $f^2$, which projects through the slot $f^3$ in the frame-upright. The driving-roller of the conducting-apron is mounted in the front and rear portions, $F^4 F^5$, of the main frame, and the clearing-roller is mounted at its ends in these portions of the frame, (see Fig. 7,) its journals passing through the supporting studs or hubs of socket-caps $f^4 f^4$, into which the ends of the roller project. The roller ends fit snugly and turn freely in these socket-caps, which serve to prevent entanglement of the grain with the roller by guarding against possibility of the grain getting between the ends of the roller and the frame.

The pitch-board F is shown as of angular form, being made in two sections of different pitch or inclination, secured together by two suitably-attached metallic back straps, $F^6 F^6$. The inclination of the upper section of the pitch-board is slight, to clear the driving-wheel, the inclination of the lower section being much greater, its lower edge terminating close into the driving-wheel, thus economizing space. Turn-buttons $f^5 f^5$, when adjusted, bear down upon the opposite ends of the pitch-board at top to hold it in place. At its lower edge the pitch-board is supported upon a frame-bar, $F^7$, secured to frame-posts $F^8 F^8$, supported by the frame-bar $A^2$. Two or more dowel-pins, $f^6$, secured at intervals in and projecting upwardly from the bar $F^7$, hold the pitch-board against movement. These dowel-pins are beveled, for a purpose in turn to be explained. The lower edge of the pitch-board is notched, to engage the dowel-pins in obvious way. By turning up the buttons $f^5$ the pitch-board may be removed and be inserted in place, and then secured by turning down the buttons, as will readily be understood.

To prevent injurious frictional contact of the pitch-board with the clearing-roller, the ends of the pitch-board at its upper edge are shouldered, and in this way the weight of the pitch-board is supported by the socket-caps $f^4 f^4$. (See Fig. 7.)

The grain passes down the pitch-board to the action of suitable rotary packing mechanism, further on to be described in detail, the teeth or arms $f^7$ of which force the grain along a way, G, to within reach of a vibrating binding-arm, $F^9$, and similarly-vibrating gavel-separating arms $f^8 f^9$, constructed and operating as in turn to be explained.

At the rear of the way G and binding-receptacle there is suitably secured a grain guard or fence, $G^2$, for directing the head ends of the stalks of grain and preventing backward movement of the grain, and at the front of the way and receptacle there is provided an adjustable butter, $G^3$, for evening the butts of the grain and adjusting it lengthwise, for a well-known purpose. This butter is inclined to correspond with the inclination of the bottom of the grainway and binding-receptacle, and is jointed by hinges $g g$ to the main frame, so that it may be adjusted to move the grain more or less backward on its way to be bound. The butter is adjusted by means of a controlling-rod, $g'$, which is jointed at its front end to the butter and extends backward to within reach of the driver when occupying his seat. The controlling-rod is held in its adjusted position in suitable way—as by means of the detent-bracket $g^2$, secured at its base to a cross-bar, $g^3$, of the main frame, and having a loop or eye at top, through which the rod passes loosely, the rod being provided with a series of notches in its under surface for engagement with the bracket, as will readily be understood. (See Figs. 2 and 3.)

The bottom of the binding-receptacle and grain-passage way leading thereto is constructed in sections and secured in position as next to be described. The rear section, $G^4$, of this bottom is quite narrow and is fastened at top to the frame-bar $F^7$, and at bottom has a supporting connection with a frame-bar, $G^7$. The rear section, $g^5$, of a binding-table or bundle-supporting horizontal portion of the bottom of the grain-receptacle is secured to and fastened in place with the section $G^4$. The sections $g^5$ and $G^4$ are connected by way of one or more angle-blocks and securing-screws, as soon will be apparent. A readily-removable section, $G^5$, of the bottom is firmly secured in suitable way, as by screws, and one or more angle blocks, $g^6$, Fig. 29, at its lower end to the main section $G^6$ of the binding-table or horizontal portion of the bottom of the grain-receptacle. The angle-blocks or block for connecting the sections $G^4$ $g^5$ are the same as that shown at $g^6$. At top the section $G^5$ rests upon the bar $F^7$, and is detachably held in place by a turn-button, $g^7$, (or several such buttons,) engaging a notch in the pitch-board. At bottom the section $G^5$, together with the section $G^6$, is supported and detachably held in place by the frame-bar $G^7$ and hooks $g^8$, engaging notches in the bar. (See Figs. 2, 28, and 29.) The bar $G^7$ is fastened upon the main frame-bar $a^2$. The section $G^6$ of the binding-table serves, as will further on become apparent, to prevent upward movement or displacement of various parts of the knotting-mechanism, and as a cover for this mechanism, ready access to which may be had by removing the attached sections $G^5$ and $G^6$ in obvious way and detaching the removable guard-cap, described further on. Another removable section, $G^8$, of the bottom of the grainway and receptacle is secured in place at top by one or more buttons, $g^9$, and at bottom by one or more hooks, similar to those, $g^8$, above described, engaging with a notch or notches in a cleat, $G^9$, secured upon the frame-bar $a^2$. (See Fig. 2.) The beveling of the dowel-pins $f^6$ provides for removing and replacing the sections $G^5$ $G^6$ $G^8$ without obstruction by them. The front section, H, of the bottom of the grainway and receptacle is supported at its upper and lower ends by being suitably fastened to the frame-bar $F^7$ and cleat $G^9$. The lower edge of the butter $G^3$ is close to this section H. A section, H′, of the binding-table is screwed in place, and the rear edge of the removable section $G^8$ at and near its lower end terminates below, but in the vertical plane extending along, the front edge of this fixed section H′. From the pitch-board down to the binding-table the rear edge of the section $G^8$ terminates at and in line with a slot in which the binding-arm works, as further on to be described.

It will be seen that the sections H and $G^8$ constitute a portion of the binding-table regularly inclined from the upper to the lower end, and that the horizontal parts $G^6$ and $g^5$ underlie and support the lower ends of the inclined sections $G^5$ and $G^4$.

In order to insure proper engagement with the grain of the packer-arms, the binding-arm, and the gavel-separating arms, and to admit of the descent of the binder-arm and the separating-arms to the needed extent, the grainway and receptacle are provided with ribs and slots, as follows: The front set of packer-arms, $f^7$, move, when acting on the grain, with their points above and close to the curved upper surface of a rib, $h$, and by the side of and at the same height as or slightly below the curved upper surface of a rib, $H^2$, which is secured by the side of and in rear of the rib $h$, and between it and another rib, $h^2$. The front and rear ribs, $h$ $h^2$, are of similar construction, having the downwardly-curved or inclined ends $h'$ and $h^3$, respectively. A slot, $H^3$, extends from between the ends $h'$ $h^3$ of the ribs, in line with the intermediate rib, $H^2$, to accommodate the point of the separating-arm $f^9$. The intermediate rib abruptly inclines or curves downward at its lower end, terminating at the upper end of this slot, as clearly shown. The ribs are secured to the bottom of the grainway and receptacle, and, while overlapping the lower edge of the pitch-board, are not attached to it. The binding-arm $F^9$ works in a slot, $H^4$, between the two removable sections $G^5$ and $G^8$, and the intermediate set of packer-arms work at their points close to and in front of a curved rib, $h^4$, in line with the slot $H^4$, and secured to the section $G^8$, where it terminates close to the adjacent portion of the section $G^5$. The abruptly-inclined or curved lower end of the rib $h^4$ terminates at the binder-arm slot $H^4$. Doubly-curved ribs $H^5$ $h^5$, at opposite sides of the slot $H^4$ and rib $h^4$, support the grain while being acted upon by the packer-arms and by the binder-arm until the grain is moved from these ribs to the binding-table. The rear set of packer-arms, $f^7$, act at their points by the side of the rib $H^6$, and the rear separating-arm, $f^8$, which is slightly smaller or shorter than either the front separating-arm or the binder-arm, acts in the slot $h^6$, which is partially formed in the binding-table. A shield formed by a metallic strap, $h^7$, prevents ready access of dirt, &c., to the knotting mechanism by way of that portion of the slot $h^6$ which is in the binding-table. The rib $H^6$ and the other ribs of the series above described are preferably protected by being faced with metal, as shown.

The intermittingly-actuated rotating packer-shaft $d^4$, brought to rest and started in motion, as further on to be explained, is supported near its rear end in a bearing, $h^8$, secured to the rear upper cross-bar, $H^7$, of the main frame, and is suitably supported between its ends and at its front end in bearings provided in brackets H⁸, secured to and projecting downwardly from inclined cross-bars H⁹ of the main frame. As shown, there are three of these bars H⁹, and they, as well as the before-described cross-bar g³, are fastened at their inner ends to a wide main-frame bar, h⁹, over the driving-wheel and grain elevating and conducting apparatus, and at their outer ends to an outer upper bar, I, of the main frame. The brackets H⁸ are represented as of skeleton or scroll-like form, and are adapted to clear the grain from the series of rotary packer-arms f⁷. The series of packer-arms consist of three sets, each set composed of two short radiating arms projecting in diametrically-opposite directions from a circular peripherally-flanged body portion or central disk, i, which is secured to the packer-shaft. Each packer-arm is pointed, having its edges curved toward each other from its wide base end or juncture with the central disk to its outer end. The advance edges i' (see Fig. 3) of the arms—those edges which come in contact with and act against the grain—are flanged, to prevent them from cutting or breaking the stalks of grain, each flange running to a point at the end of the arm. (See Figs. 1, 2, and 3.) Those portions i² of the brackets H⁸ which serve as clearers, to prevent the grain from being carried upward by the packer-arms, are flanged, so as to present sufficiently broad surfaces to the grain to avoid breaking or cutting into the stalks in arresting their upward movement, and are eccentric to the packer-shaft, so that the packer-arms as they ascend are gradually withdrawn from the grain, as will readily be understood. Each of the brackets is adjustably attached to its supporting-bar by means of securing-bolts passing through slots i³ i³ in the inner and outer ends of the brackets. (See Fig. 3.) From the above description it will be seen that when the packer is brought to rest with its broad pointed arms in the positions in which they are represented in the drawings, the binder-arm and the gavel-separating arms, when they are caused to descend, effect a complete separation of the grain, forming an accumulated gavel from that in and being directed toward the grainway G. The enlarged central portions or disks of the packer materially aid in effecting the separation of the grain about to be bound from that accumulating against the packer, as these disks widely separate the bulk of the grain being presented to the packer from that in the binding-receptacle, thus lessening liability of entanglement of loose grain with that of an accumulated gavel.

The clutch mechanism, Figs. 1, 4, 36, 37, 38, and 39, shown as employed for engaging and disengaging the packer-shaft d⁴, and its loosely-mounted driving-pulley D⁴, is in mode of operation and general features of construction similar to that shown in my before-mentioned Patent No. 267,521, and in Letters Patent of the United States granted to me June 20, 1882, No. 259,852. In practice the clutch shown in my said patents was found to be somewhat defective. The clutch as it is now made is free from defects. It is constructed as follows: A clutch barrel or cylinder, A⁶, formed with the pinion D⁴, is internally toothed, as shown, the teeth a⁶ being like ordinary spur-gear teeth, instead of being ratchet-like or V-shaped, as before. A pawl-carrier, a⁷, is formed with or rigidly secured to a clutch-sleeve, A⁷, attached to the packer-shaft by means of a cross-pin, a⁸. A disk, A⁸, is mounted loosely on the clutch-sleeve, and the cross-pin, being outside this disk, holds it in place. A side stud, a⁹, at the outer end of the pawl A⁹, projects through a tangential slot, b⁶, in the clutch-disk, and is acted upon by the inclined or cam-like opposite walls of this slot, to move the pawl into and out of engagement with the teeth of the clutch-barrel. A side lug or tooth, b⁷, at the outer end of the pawl, engages with the teeth of the clutch-barrel, instead of the pawl engaging directly at its end with the teeth, as before, and in this way the pawl may be made quite short, and does not need to be curved as much as before, and consequently it is rendered stronger. The pawl, instead of being pivoted, as before, is mounted in the carrier a⁷ in such way that the strain exerted upon the pawl is of the nature of a thrust from end to end or lengthwise thereof, instead of being to a considerable degree crosswise of the pawl, as before, so as to result sometimes in breaking or bending the pawl. As shown, the pawl has a flaring inwardly-projecting arm or heel-lug, B⁷, at its inner end, and this lug and the extreme end of the pawl are rounded, to bear against the correspondingly-shaped seat or bearing-shoulder b⁸ of the lug-receiving recess B⁸ in the pawl-carrier. The heel-lug of the pawl fits loosely, but so as to prevent accidental displacement, in this recess. A spring, b⁹, acts upon the pawl-stud a⁹, to quickly throw the pawl-tooth b⁷ inward or away from the clutch-barrel when disengaged from its teeth, and to hold the pawl against the inner inclined wall or cam side of the slot b⁶ when out of operation. A spring, B⁹, is coiled about the clutch-sleeve, secured in place by the cross-pin a⁸, and adjustably secured at its outer or free end in one or other of several holes in a curved rib, d⁷, of the clutch-disk. This spring acts with a tendency to rotate the clutch-disk in the direction that the packer-shaft rotates in, performing the same function as a spring before employed. There are two tripper-engaging lugs, D⁷ D⁷, formed with or rigidly secured to and projecting from the clutch-disk diametrically opposite each other. These correspond in number and relative arrangement to one another with the number and relative arrangement to one another of the arms f⁷ of the respective sets of packer-arms. A greater number of packer-arms to the set and a correspondingly-increased number of tripper-engaging lugs may be employed, if desired—say, three lugs and three packer-arms to the set—properly arranged in obvious way, so that when the rotation of the packer-arms is arrested, as presently to be described, one arm of each set will be brought to rest, so that the binding-arm and the gavel-separating arms will descend by the sides of the packer-arms and the gavel to be bound be thoroughly separated from other grain.

A pivoted clutch-tripping arm, $D^8$, actuated, as further on to be explained, when a gavel has been accumulated, is provided with a lug, $d^8$, which, when the arm is moved inward or toward the packer-clutch, is brought in or across the path of rotation of the lugs $D^7$, and engages with the first one of the lugs presented to it. As will readily be understood, (see my before-mentioned Patent No. 259,852,) when the movement of the clutch-disk is thus arrested the outer cam-like wall of the disk-slot will act upon the pawl-stud for the instant of time during which the pawl moves with the clutch-barrel, and the pawl will be thrown out of engagement and then be acted upon by the spring $b^9$. Simultaneously with the disengagement of the pawl and clutch-barrel the packer-shaft ceases to rotate. To prevent rebound or backward movement of the packer-shaft when its rotation is thus suddenly arrested, a ratchet-wheel, $D^9$, fast on the packer-shaft, is engaged by a pawl, $d^9$, Figs. 1 and 20, which is shown as fastened to the forward end of a short rock-shaft, $C^6$, mounted in a sleeve-bearing, $c^7$, suitably supported by the main frame and actuated by the clutch-tripping arm $D^8$. This arm is fastened to the rear end of the rock-shaft and serves as a crank for operating it. The pawl $d^9$ is made of spring-metal, though amply stiff against thrusting strain to perform its function, and is bent inward or toward the ratchet at its outer or free end. When first swung in against the ratchet $D^9$, the pawl may give slightly, to permit of the rotation of the packer-shaft during the instant which is occupied in stopping this shaft after moving the pawl inward with the clutch-tripping arm. When this tripping arm and pawl are swung outward, by means yet to be described, the motion of rotation imparted to the clutch-disk by the spring $B^9$ results in throwing the clutch-pawl into engagement with the clutch-barrel, by reason of the action upon the pawl-stud of the inner cam-wall of the disk-slot, as will readily be understood, and the packer-shaft rotates with its driving-pulley actuated by the chain $C^3$. Instead of the pulley and chain, equivalent mechanism may be used to actuate the packer-shaft.

The clutch $C^7$, Figs. 4, 8, and 40, by which the loose pinion $c^6$ of the primary driving-shaft $a^3$ is engaged with or left free to rotate independently of this shaft, to throw it into and out of gear with the driving-wheel, is similar to the packer-clutch above described, except that there is but one tripper-engaging lug, $c^9$, on the disk of this clutch $C^7$. A tripper-lever, $C^8$, pivotally supported by a bracket on the cross-beam $E^7$ of the main frame, is provided with a suitable detent, $C^9$, at its inner or handle end, and has a lug, $e^7$, at its outer end, to engage the clutch-lug $c^9$. The operation of these parts will readily be understood.

A main actuating-gear, I', serving by connecting mechanism to operate the binding mechanism, is provided with a clutch, $I^2$, by which to engage it with and disengage it from its intermittingly-operating binder-actuating shaft $I^3$, which makes one revolution at each operation, and is mounted between its ends to rotate in front and rear bearings, $e^8$ $e^9$, shown as formed in a sectional bracket-frame, $I^4$, secured to the cross beams $E^7$ and $E^8$ of the main frame. The details of construction of this bracket-frame will be described further on. The main-actuating gear is rotated continuously during the operation of the main actuating-shaft $A^5$, by means of a pinion, $E^9$, fast on this shaft. In its usual or normal condition the main-actuating gear is unclutched from its shaft, so that the rotation of the gear does not impart motion to the shaft. The clutch $I^2$ is the same in construction and mode of operation as the clutches hereinbefore described, being, like the clutch $C^7$, provided with only one tripper-engaging lug, $i^4$. A lug, $i^5$, of a tripping-lever, $I^5$, normally engages the clutch-lug, to prevent rotation of the intermittingly-operating binder-actuating shaft with the main actuating-gear loosely mounted upon it.

As will readily be understood from the description before given of the packer-clutch and the clutch of the primary driving-shaft, rotary motion is imparted to the intermittingly-operating binder-actuating shaft $I^3$ when the tripping-lever $I^5$ is disengaged from the clutch $I^2$. As shown, this tripping-lever is pivoted at its lower end to a frame-bracket, $i^6$, is of angular form, inclining first inward toward the clutch and then outward to its upper end, and is operated to trip the clutch and start the intermittingly-operating binder-actuating shaft by means such as next to be described.

A rock-shaft, $I^6$, mounted near its ends in brackets $I^7$ $i^7$, secured to the frame-bar I, is provided at its rear end with a downwardly-projecting longitudinally-slotted crank, $I^8$, and a pin secured to the upper end of the tripping-lever $I^5$ engages the slot in the crank. At its front end the rock-shaft is provided with an upwardly-projecting crank, $i^8$, adapted by means of a series of holes and a pin to have adjustable jointed connection with the outer end of a link-rod, $I^9$, forming part of starting mechanism actuated by the pressure of the grain, and this link-rod at its inner end has similar adjustable jointed connection with the upper or inner end of a vertically-vibrating lever, $i^9$, (best seen in Fig. 9,) constituting one of the elements of said starting mechanism. As shown, this starting-lever is of elbow form, and it is pivoted to one of the cross-bars $H^9$ of the frame.

From the above description it will be seen that by a pull on the link-rod—such as would result from rocking the starting-lever, so as to cause its upper arm to move inward or toward the grain-platform side of the machine—the rock-shaft I⁶ would be actuated to trip the clutch of the main actuating-gear and throw its intermittingly-operating shaft into action, and that then, by an outward endwise movement or thrust of this link-rod, the rock-shaft would be actuated in such manner as to swing the crank on its rear end inward, and by the corresponding inward movement imparted to the clutch-tripping lever connected with this crank bring the lug of this lever into position for engaging the clutch-lug to throw the intermittingly-operating actuating-shaft out of engagement with the main actuating-gear at the completion of a revolution of this shaft.

In order that the starting mechanism may be operated by the driver when in his seat, instead of automatically or by the pressure of the grain, the upper arm of the lever $i^9$ of this mechanism is pivotally connected with the outer end of an endwise-moving rod, J, passing near its inner end through an opening in a supporting-bracket, $j$, secured to the main frame-bar $h^9$, and flexibly jointed by a link, $j'$, to a horizontally-vibrating foot-lever, J', pivoted to said frame-bar. A spring, $j^2$, coiled about the rod J, and bearing at one end against a nut adjustable on said rod and at its other end against the bracket $j$, acts with a tendency to hold the parts in their normal positions, and to restore them to such positions after the starting mechanism has been actuated, and the rod J serves to check the outward movement of the link-rod, the link $j'$ of the rod J coming in contact with the bracket $j$ when the rod is moved outward, as will readily be understood.

The lower or outer end of the starting-lever is provided with an adjustable section or head, J², upward against which the grain presses when accumulated in the binding-receptacle.

The manner of securing the head of the starting-lever to the lever proper, to provide for adjusting the head so as to insure proper work, is most clearly shown in Figs. 26 and 27. The starting-lever, which is of metal, is broadened and provided with a curved slot, $j^3$, near the termination of its lower end, and the head J², which is of wood, has side plates, J³ J³, secured to it at its inner end. These plates extend beyond the end of the head flush with its opposite sides, and embrace the end of the starting-lever, to which they are jointed by the pivot $j^4$. A headed bolt, J⁴, passing through the slot $j^3$ and through the side plates and its nut, serves as will readily be understood, to adjust the head and secure it to the lever.

From the above description it will readily be seen that when grain to form a gavel has been accumulated beneath the head of the starting-lever, the upward movement of the head and consequent vibration of the lever will result in throwing the binder-actuating shaft into operation. It will also be seen that by adjusting the starting-lever head and the link-rod I⁹ the starting mechanism may be adapted to be actuated by different quantities of grain, provision being thus made for varying the sizes of gavels. A guard, J⁵, formed by a rod having its ends bent upwardly and secured to the cross-bar $g^3$ of the frame, limits upward movement of the grain and prevents its entanglement with parts of the mechanism.

A rock-shaft, J⁶, to which the binder-arm F⁹ and the gavel-separating arms $f^8 f^9$ are attached, is supported beneath the frame cross-bars $g^3$ H⁹ in suitable bearings, and at its rear end in a bearing, $j^5$, of the sectional bracket-frame I¹. The binder-arm is adjustably secured to its rock-shaft in the following way: A sleeve, $j^6$, formed with a segmental gear, J⁷, and a stud-arm, $j^7$, projecting from it in opposite directions, is secured to the rock-shaft in suitable way, as by a set-screw. The binder-arm is connected to this stud-arm in such way as to be adjustable vertically without altering the "set" or adjustment of the sleeve and segmental gear. At its heel the binder-arm is formed with side extensions, J⁸, which embrace the stud-arm of the sleeve and are jointed thereto by the bolt $j^8$ and its nut close to the sleeve. A securing-bolt, $j^9$, provided with a nut, passes through a curved vertically-extending slot in the outer end of the stud-arm, as well as through perforations in the binder-arm heel-extensions and through slots in wedge-clips J⁹ at the side of these heel-extensions. The slots in the wedge-clips extend lengthwise of them and at right angles with the slot in the stud-arm. Laterally-projecting or overhanging lugs K K are formed at the opposite sides and top of the stud-arm at its outer end, and each of the wedge-clips is inclined at its upper edge and provided with an inwardly-projecting flange, $k$. The flanges of the wedge-clips bear upon the upper edges of the heel-extensions of the binder-arm beneath the lugs of the stud-arm. It will readily be seen that by loosening the securing-bolt $j^9$ and adjusting the wedge-clips toward or away from the sleeve $j^6$ the binder-arm can be lowered or raised and the parts be then secured by tightening the nut of the securing-bolt.

The segmental gear J⁷, with which the heel of the binder-arm is connected, engages a segmental pinion, K', secured to a short shaft, $k'$, mounted in a sleeve-bearing, $k^2$, attached to the outer end of one of the cross-bars H⁹ of the frame. The shaft $k'$ also carries a yielding vibrating compressor, K², between which and the binder-arm the bundles of grain are compressed and held for binding. As shown, the compressor is forked or two-armed, the arms being curved for an obvious purpose. The compressor-arms are attached to a yielding shank or spring supporting-arm, K³, by which they are secured to their carrying-shaft with the segmental pinion thereof. As shown, the compressor-shank is fastened at its heel end to one end of a curved holder, $k^2$, formed with the pinion K', a bolt and nut serving to attach the shank to the holder. (See Fig. 3.) As the shank is secured to that end of the holder most remote from the curved compressor-arms, and normally bears against the curved surface of the holder only at and near said end, it will be obvious that as the shank yields to pressure there will be an increase in the length of the bearing against the holder, and that the resistance of the shank against yielding to pressure upon the compressor will be correspondingly increased.

From the above description it will be understood that the compressor is caused to descend and ascend with the binder-arm by means of the gearing connecting the binder-arm rock-shaft with the compressor-shaft, and that the compressor is adapted to operate upon bundles varying considerably in size.

In addition to its function of actuating the compressor from the binder-arm rock-shaft, the segmental gear $J^7$ is made the medium by which tension mechanism is actuated from this rock-shaft, to cause it to release the binding-cord at the proper time to supply slack cord to the knotting mechanism to facilitate the formation of the knots in the bands about the bundles. As shown, the tension mechanism (best represented by Figs. 41 and 42) consists of a vertically-moving curved clamp-arm, $K^4$, borne upon by a spring, $K^5$, adjustably secured to the frame-bar I, so that its pressure may be controlled, and supported by its vertically-reciprocating shank, $K^6$, which passes through said frame-bar and through a securing-plate, $K^7$, attached to this bar. The plate has three studs, $k^4\ k^5\ k^6$, formed with or rigidly attached to it. The studs $k^4\ k^5$, together with a recess in the securing-plate between the bases of these studs, constitute a guideway, to which the binding-cord is conducted from a suitable cord-receptacle, $K^8$, and from which the cord passes to the binder-arm and is engaged with it in usual way. The studs $k^5\ k^6$ form a guideway for the clamp-arm and prevent it from moving otherwise than vertically. Normally the cord is held under tension, as will readily be understood. When the cord is to be relieved from tension, a side lug, $k^7$, of the segmental gear $J^7$ strikes the lower end of the clamp-shank and moves it upward until the clamp has been raised against the pressure of its spring sufficiently to release the cord. The lug of the segmental gear is brought against the clamp-shank at a time when the binder-arm has nearly completed its downward movement, so that by the time the binder-arm reaches its lowermost position, (see dotted lines, Fig. 9) the cord will be free from tension. Upon the upward movement of the binder-arm the clamp again acts to produce tension upon the cord, as will readily be understood.

Mechanism is provided for forcibly discharging bound bundles, and is as follows: In this instance, two vertically-swinging endwise-reciprocating discharger-arms, $K^9\ K^9$, are employed; but it is not absolutely requisite that any particular number of discharger-arms be provided. A single arm only might be used, but two are preferable. The upper ends or shanks of the discharger-arms are slotted longitudinally and have pivotal and sliding connection with a supporting-bracket, $k^8$, secured to the frame-bar I and projecting outwardly therefrom. Pivot-bolts $k^9\ k^9$, projecting through the slots in the shanks of the discharger-arms, connect with the ends of the bracket in or about in the same vertical plane as the outer edge of the binding-table, the bracket overhanging the binding-table. The discharger-arms are pivotally attached near their shanks or beneath their connection with the supporting-bracket, to the cranks $l\ l$ of a doubly-cranked intermittingly-actuated rotating shaft, L. This shaft is mounted in suitable bearings at or near its front and rear ends, the front bearing being secured beneath the projecting end of the frame cross-bar $g^3$ and the rear bearing, $l'$, being secured to an adjustable frame-standard, $L'$, near its upper end. This standard and another standard, $L^2$, (see Figs. 1, 2, 4, 7, and 8,) are pivotally secured at their lower ends to the front and rear of the main frame cross-beam $E^7$ by a bolt, $l^2\ l^2$, so that they may be rocked slightly. At top the two standards are connected together by a bolt, $l^3$, passing through them and through an interposed spacing-block, $l^4$, and are adjustably attached to the outer end of the rear upper cross-bar, $H^7$, of the main frame by means of an elongated slot in this bar, through which the bolt passes and is secured by its nut, as will readily be understood. The standard $L'$ is shouldered at top to pass in front of and rest against the cross-bar $H^7$. This provision for slightly adjusting the standards $L'\ L^2$ is for taking up slack in a driving-chain, presently to be referred to. A pinion, $L^3$, of the mechanism for driving the shaft L, and having spring-connection with it, is mounted upon this shaft near its rear end and is engaged by a pinion, $L^4$, formed with or rigidly attached to a sprocket-pulley, $l^5$, driven by a chain, $L^6$, actuated by a sprocket-pulley, $l^5$, secured to the front end of the binder-actuating shaft $i^3$. In this way a revolution is imparted to the discharger-shaft at each actuation of the binder-actuating shaft $i^3$. The pinion $L^4$ and pulley $l^5$ are mounted on a shaft, $l^6$, supported by the standards $L'\ L^2$. (See Fig. 2.) The spring $L^7$, by which the pinion $L^3$ is yieldingly attached to the discharger-shaft L, is coiled about this shaft and connected to it at one end by a pin. At its other end the spring is connected to the pinion. The rearwardly-projecting elongated hub $L^8$ of the pinion is provided with two projections, $l^7\ l^7$, diametrically opposite each other, and a cross-pin, $l^8$, secured to the discharger-shaft, projects at its ends into recesses $l^9\ l^9$ between the hub projections. (See Figs. 43, 44, and 45.) A single recess and a cross-pin projecting in one direction only from the discharger-shaft and into this recess may be used instead of the two recesses and cross-pin shown.

From the above description it will be understood that when motion is imparted to the discharger-shaft the discharger-arms are moved first upward and inward and over the gavel, and then downward and outward to the bundle to be acted upon, and that when the discharger-arms are pressed against the bundle before it is completely bound, and while the compressor is acting, the discharger-shaft for a while will cease to move with that pinion of the driving mechanism which is mounted upon the shaft, the spring-connection between the shaft and pinion yielding, and the rotation of the pinion about the shaft altering the relative position of the cross-pin of the shaft and the projections of the pinion-hub against which the pin is normally held by the action of the spring, the tendency of the spring being to rotate the shaft with or faster than its pinion. The parts are represented as in their normal relative positions in Figs. 43 and 44, and by dotted lines in Fig. 45. The full lines, Fig. 45, show the positions occupied by the parts when the spring-connection between the discharger-shaft and its pinion yields, to admit of the movement of the discharger-arms being checked by contact with a bundle preparatory to discharging it by a quick action. When, by a rapid upward movement of the compressor-arms a bound bundle is released by them, the discharger-shaft and its arms, being now free to act, have imparted to them a very quick movement by the spring connecting the discharger-shaft and its pinion, the discharger-arms moving for a while—say from the position in which one of them is shown in full lines to that in which it is represented by dotted lines in Fig. 45—much faster than the pinion of the discharger-shaft, and thus insuring the discharge of the bundle and the breaking or tearing away of any stalks of grain which possibly might otherwise connect the bundle with the grain to constitute another bundle. By the time the discharger-shaft completes a revolution the parts come to rest in the positions in which they are represented by Figs. 2 and 9 and elsewhere in the drawings.

The sectional bracket-frame I$^4$ is of peculiar construction, and is shown as formed, as next to be described, in five parts or sections securely but detachably fastened together and to the main-frame bars E$^7$ E$^8$. The front base-section, M, is provided with short end posts, $m$ $m$, each divided into two parts by a vertical slot, Figs. 13 and 14, extending through the base, to accommodate the fastening-bolts $m'$ $m'$. The posts are shouldered at their corners at top to form seats for receiving the ends of the front cross-head portion, M', of the base of the main or body section of the bracket-frame. The ends of the cross-head rest upon the posts $m$ $m$ and fit snugly in the seats formed between their corner-shoulders. The cross-head is thickened by a top rib endwise lengthwise of it. The fastening-bolts $m'$ $m'$ pass through the beam E$^7$, through the base-section M, and through the ends of the ribbed portion of the cross-head M', and are secured by nuts. The upwardly-projecting central portion or standard, M$^2$, of the body-section of the bracket is provided with the bearing $e^8$, for the binder-actuating shaft I$^3$, and the bearing $e^9$ for this shaft is formed at the top of the rear standard, M$^3$, of the body-section. At the flanged base of this rear post the body-section is bolted to the frame-beam E$^8$. Side plates, M$^4$ M$^5$, forming an upward extension of the central standard, M$^2$, of the bracket-body, are firmly but detachably secured to each other and to the central standard by bolts $m^2$ $m^3$ $m^4$ and their nuts. The lower bolt, $m^2$, passes through the side plates and through the web $m^5$ of the lower portion of the central standard, and the plates are drawn tightly against the edges of the vertically-extending side flanges of the standard. Inwardly-projecting lugs $m^6$ $m^6$ at the tops of the plates abut at their inner ends against each other, as do other lugs, $m^7$ $m^7$, near the tops of the plates when the plates are secured together by the bolts $m^3$ $m^4$. Inwardly-projecting supporting-lugs $m^8$ $m^8$ at the bases of the side plates rest upon the horizontally-extending lower portion of the central standard, thus relieving the bolt $m^2$ of weight, and rocking or pivotal movement of the side plates about this bolt is prevented by means of lugs $m^9$ $m^9$ of the side plates bearing against the rear of the central standard at its top, and a lug, M$^6$, on one of the side plates bearing against a shoulder at the front of the central standard at top, as plainly shown. The bolts $m^3$ $m^4$ serve to secure a bracket-arm, M$^7$, to the side plates. This bracket-arm is provided with the bearing $j^5$ for the binder-arm rock-shaft, and is also provided with a two part bearing, M$^8$, for a purpose soon to be explained.

Grooves $n$ $n$ in the sides plates of the sectional bracket-frame I$^4$ constitute a guideway for a vertically-reciprocating slide, N, of a cam-yoke, N'. As in my above-mentioned Patent No. 267,521, the slide is provided with an elongated slot, and by means of this slot it embraces the binder-actuating shaft and is allowed direct up-and-down movement or rectilinear reciprocation without interfering with the shaft. In essential particulars the mechanism for actuating the cam-yoke and for imparting movement to the rock-shaft of the binder-arm differs materially from the means before employed by me and set forth in my said patent, as will be apparent from comparison.

A rocking arm, N$^2$, pivotally mounted at one end in the bearing M$^8$ of the sectional bracket-frame I$^4$, is connected at its opposite end by a link-rod, $n'$, with a crank, N$^3$, of the binder-arm rock-shaft, as best shown in Fig. 4. The rocking arm N$^2$ has jointed connection with the cam-yoke slide by means of a link, $n^2$. It will be seen that by my present invention I provide a double-lever or toggle-like connection between the cam-yoke and the binder-arm rock-shaft with obvious advantage over the before-employed single-lever or direct-crank connection. The cam-yoke is operated by means of rollers $n^3$ $n^3$, carried by a wheel, $N^4$, on the binder-actuating shaft, instead of by a simple crank-arm, as before. The rollers are mounted at the front side or inner face of the wheel on suitable studs projecting from the wheel near its periphery. (See Fig. 4.) The cam-yoke is reciprocated vertically close to and in front of the roller-carrying wheel by the action of the face-rollers of the wheel on the cam-track of the yoke, and the wheel is formed with a flanged periphery. This peripheral flange $n^4$ projects rearwardly, and is made to constitute a cam to actuate mechanism such as next to be described for operating the clutch mechanism of the packer-shaft when the packer-arms are to be brought to rest, as before explained. A vibrating clutch-controlling arm, O, supported at its lower end by pivotal connection with the frame-bracket $i^6$, is forked or slotted at its upper end to engage a headed pin, $o$, secured to an endwise reciprocating connecting-rod, O', which is pivotally attached at one end to the tripping-arm $D^8$ of the packer-clutch and supported at its other end by a bracket, $o'$, secured to and projecting downward from the frame-bar I. (See Figs. 1 and 4.) The reciprocating connecting-rod passes loosely through an opening in the supporting-bracket $o'$, so that it may be given the proper movements. A spring, $O^2$, coiled about the connecting-rod, bears at its opposite ends against the supporting-bracket and a collar or shoulder, $o^2$, of the connecting-rod. This spring acts with a tendency to hold the clutch-tripping arm in its normal position, out of engagement with the clutch, and to restore the arm to this position after engagement with the clutch. A roller, $o^3$, on the clutch-controlling arm O, works in contact with the peripheral cam of the wheel $N^4$, being held against the cam by the spring $O^2$, as will readily be understood. Normally the roller rests in the recess $n^5$ of the cam. (See Fig. 4.)

From the above description it will be seen that when the binder-actuating shaft is started in the manner already explained, the cam-wheel $N^4$, rotating therewith, will quickly operate the controlling-rod, the recessed portion $n^5$ of the cam passing out of contact with the roller of the controlling-rod, and the regular portion of the cam being presented to the roller, thus moving the controlling-rod outward and actuating the tripping-arm of the packer-clutch to stop the rotation of the packer-arms. The packing mechanism having thus been brought to rest almost instantaneously with the commencement of the movement of the binder-actuating shaft, the binder-arm and the gavel-separating arms are next started in action by the movement imparted to their rock-shaft from the cam-yoke N' by the before-described mechanism connecting this yoke with the rock-shaft. The shape of the cam-track of the yoke and the manner of actuating the yoke and connecting it with the binder-arm rock-shaft are such (see Figs. 4 and 17) that the binder-arm and gavel-separating arms are given a quick downward movement at the start when the yoke-actuating rollers are first brought into operation. It will be seen that when the leading roller acts upon the portion $p$ of the yoke-cam track it is moving almost directly downward, being about midway between the upper and lower dead centers or points in the rotation of the roller with its carrying-wheel when the least motion is imparted to the vertically-moving cam-yoke. Moreover, as the rocking arm $N^2$ and the crank $N^3$ of the binder-arm rock-shaft are nearly on their dead-centers when in their normal positions, the amount of circular movement imparted to said rocking arm and crank, compared to the amount of vertical movement imparted to the cam-yoke at the commencement of its operation, is considerable, insuring a very quick downward movement of the binder-arm and separating-arms until there is resistance offered to their further movement by the grain. As the distance of the rocking-arm $N^2$ and crank $N^3$ from their dead-centers increases, and as the yoke-actuating rollers approach their lower dead-centers, the movement of the binder-arm rock-shaft becomes gradually slower until by the time the curved portion $p'$ of the yoke-cam track, which at this stage in the operation is concentric with the binder-actuating shaft, is reached by the rollers the yoke ceases to move, and the rock-shaft comes to rest during the knotting operations. Just before the completion of the downward movement of the binder-arm the tension mechanism is actuated to release the binding material, as before explained. Next, after the completion of the knotting operations, and when the leading yoke-actuating roller has been carried upward to a point about midway between its upper and lower dead-centers, the portion $p^2$ of the yoke-cam track is acted upon by the roller, and the movement thus imparted to the binder-arm rock-shaft moves the binder-arm and gavel-separating arms upward with a quick movement, the corresponding movement imparted to the compressor by connection with the binder-arm rock-shaft, as before explained, leaving the bound bundle free to be thrown off by the discharging devices in the manner already described. Upon the completion of the revolution of the binder-actuating shaft it is thrown out of engagement with the main actuating-gear by the before-described clutch mechanism, and, the roller on the controlling-arm of the packer-clutch having entered the cam recess $n^5$, the packer-arms again rotate.

It will be seen that by employing the two rollers for actuating the cam-yoke accidental and injurious movement of the binder-arm rock-shaft during the operation of the cam-yoke is prevented, as the following roller does not leave one portion of the cam-track acted upon until the leading roller has reached or nearly reached the portion of the track to be next acted upon, thus guarding against premature upward or downward movement of the yoke to an injurious extent, and consequent movement of the binder-arm, which might otherwise take place, owing to the backward pressure upon the binder arm by the compressed grain embraced by it, or by the action of gravity.

The actuating mechanism of suitable knotting mechanism is operated from the intermittingly-operating binder-actuating shaft by connecting mechanism, such as next to be described. A bevel-gear, P, on the binder-actuating shaft in advance of its front bearing, meshes with a bevel-pinion, P', fast on the upper end of a shaft mounted in a vertical bearing, $P^2$, in the cross-head M' of the body-section of the bracket frame $I^4$. A gear, $P^3$, is fast on the lower end of the shaft of the pinion P' in the space between the end posts of the base-section M of the bracket-frame. Idle-pinions $q$ $q'$, Fig. 8, communicate motion from the gear $P^3$ to a large wheel, Q, of the knotter-actuating mechanism. This knotter-actuating wheel Q is to be provided with suitable cams (not necessary to be herein described) and is toothed for engagement with the idle-pinion $q'$, and is intermittingly actuated, making a revolution at each revolution of the binder-actuating shaft, as will readily be understood. The actuating-wheel of the knotting mechanism and all parts of this mechanism are supported by a knotter-frame, $N^5$, secured to the bottom cross-bars, $N^6$ $N^7$, of the main frame. The before-mentioned guard-cap $P^8$, the flat top of which forms part of the binding table, is detachably secured over a suitable knotter and co-operating cord-clamping and cutting devices. The guard-cap is provided with a cord-guideway slot, $p^8$, for directing the cord to the knotter, and is also formed with upwardly-projecting lugs S' S', having their bases at the sides of this guideway slot. The upper surfaces of these lugs are inclined inwardly from their bases to their tops or points, and at their inner vertical or nearly vertical ends they respectively abut against or terminate close to the ribs $H^5$ and $h^5$ at the sides of the binder-arm slot $H^4$. These lugs of the guard-cap are thus caused to form continuations of the ribs $H^5$ and $h^5$, respectively, along which the grain is moved to the level of the binding-table. The pins $s'$ $s'$, passing through perforated lugs on the under surface of the guard-cap and suitably engaging with the frame of the knotting mechanism, serve to detachably hold the guard-cap in place. The knotter-actuating cam-wheel Q is mounted on a stud-shaft, $n^6$, of the knotter-frame. A lever, $N^8$, is pivoted to vibrate about the stud $n^8$. A lever, P', vibrates about the stud $p^4$, and an elbow-lever, $P^5$, is pivoted beneath the lever $N^8$, to vibrate about the stud $n^8$. Rollers $n^7$, $p^3$, and $p^5$, of the levers $N^8$, P', and $P^5$, respectively, are operated by cam-connection with the wheel Q in manner which needs no description here. The removable section $G^6$ of the binding-table (see Figs. 28 and 29) prevents upward movement of the knotter-actuating cam-wheel and the levers $N^8$ $P^5$, the under surface of this section of the binding-table being close to the hubs of the lever $N^8$ and cam-wheel. A cleat, W, on the under side of the binding-table section prevents upward movement of the lever P', the pivoting sleeve of this lever projecting upward to or nearly to the cleat, and this cleat and another cleat, W', prevent displacement of the pins $s'$ $s'$, which secure the guard-cap $P^8$ in place. It will be seen that by the removal of the section $G^6$ of the binding-table and the guard-cap access may be had to the mechanism covered by them.

Although I have shown my improvements as applied to a two-wheeled machine in such manner that while retaining all advantages arising from a hinged connection between the main frame and the grain-platform and finger-beam, and providing for elevating and conducting the grain over the main supporting-wheel and binding it above and discharging over the low supplemental supporting-wheel, I do not wish to be understood as confining my invention to the particular and preferred application shown, nor to the precise construction and arrangement of parts in all respects as represented, as details of construction and arrangement may be modified to considerable extent, and some of my improvements may be used without the others and applied to machines of different types.

I claim as of my own invention—

1. The combination of the main frame, the back beam of the grain-platform, the bearing-sleeve secured to the inner end of the back beam and having pivotal supporting connection with the main frame, the driving-roller of the endless carrier, its rear journal passing through the bearing-sleeve, the pinion secured to this journal and the carrier-actuating pinion, substantially as and for the purpose set forth.

2. The combination of the main frame, the grain-platform, the bearing-sleeve secured to the back beam of the grain-platform and having pivotal supporting connection with the main frame, the driving-roller of the endless carrier, its rear journal passing through the bearing-sleeve, the pinion secured to this journal, the carrier-actuating pinion and its attached sprocket-pulley having vertically-adjustable supporting connection with the main frame, and the driving-chain, substantially as and for the purpose set forth.

3. The combination of the rear upright bar of the main frame, the carrier-actuating pinion and its attached sprocket-pulley, the vertically-adjustable rod carrying the stud-shaft of said pinion and pulley and having the rounded side projection at its lower end, the curved guide, against which said projection bears, and the driving-chain, substantially as and for the purpose set forth.

4. The combination of the grain-elevating aprons, the conducting-apron, to and beneath which the grain is delivered by the elevating-aprons, the pitch-board, the clearing-roller beneath the conducting-apron and beyond which said apron extends in the direction of the binding-table, and the packing mechanism, substantially as and for the purpose set forth.

5. The combination of the main frame, the grain-platform, its carrier, the driving-roller of the carrier, its pinion, the carrier-actuating pinion, its attached sprocket-pulley, the elevating-aprons, their driving-rollers provided with sprocket-pulleys, the conducting-apron, its driving-roller provided with the sprocket-pulley, the packing mechanism, its shaft provided with the sprocket-pulley, the clearing-roller, its sprocket-pulley, the main actuating-shaft, its sprocket-pulley, and the driving-chain, substantially as and for the purpose set forth.

6. The combination of the elevating-aprons, the cleats between the edges of the aprons, having the recesses at $e^3$, the driving-rollers of the aprons and their driven rollers yieldingly mounted to permit of automatic variation of the distance between them and the driving-rollers, substantially as and for the purpose set forth.

7. The combination of the aprons $D^5$ $D^6$ E of the elevating and conduction apparatus, the recessed cleats between the edges of the aprons, the driving-rollers of the aprons, and their driven rollers yieldingly mounted to permit of automatic variation of the distance between the driving and driven rollers of the respective aprons, substantially as and for the purpose set forth.

8. The combination of an elevating-apron, its driven roller, the adjustable bearing-hangers for the roller-journals, having guideway-connection with the front and rear uprights of the main frame, the pivots of the bearing-hangers projecting through slots in the uprights, and the weighted levers acting upon these pivots, substantially as and for the purpose set forth.

9. The combination of the conducting-apron, its driven roller, the roller-journals projecting through slots in the front and rear uprights of the frame, and the weighted elbow-levers engaging the roller-journals, substantially as and for the purpose set forth.

10. The combination of the main frame, the clearing-roller, the socket-caps, through which the roller-journals pass and into which the ends of the roller project, and the pitch-board shouldered at the ends of its upper edge and supported by the socket-caps, substantially as and for the purpose set forth.

11. The combination of the clearing-roller, its socket-caps, and the pitch-board shouldered at the ends of its upper edge, substantially as and for the purpose set forth.

12. The combination of the clearing-roller, the pitch-board, the front and rear turn-buttons for holding down the pitch-board, and the frame-bar $F^7$ and its dowel-pins, substantially as and for the purpose set forth.

13. The combination of the frame-bar $F^7$, the section $G^5$ of the grainway resting at its upper end upon this frame-bar and detachably fastened in place, the section $G^6$ of the binding-table, to which the grainway section is fixed at its lower end, the frame-bar $G^7$, supporting the binding-table section, and to which this section is detachably fastened, and the knotter-actuating mechanism held down by the binding-table section, and to which access is had by removing this section, substantially as set forth.

14. The guard-cap $P^8$, having the slot $p^8$ and the lugs $S'$ $S'$, as and for the purpose set forth.

15. The combination of the pitch-board, the united removable sections $G^5$ $G^6$ of the grainway and binding-table, the frame-bar $F^7$, upon which the lower edge of the pitch-board and upper edge of the section $G^5$ are supported, the turn-button (or buttons) $g^7$, engaging with the pitch-board, the frame-bar $G^7$, and the hooks by which the section $G^6$ engages with this bar, substantially as and for the purpose set forth.

16. The combination of the frame-bars $F^7$ $G^7$, the united sections $G^5$ $G^6$ of the grainway and binding-table detachably supported upon said frame-bars, the detachable guard-cap, and the knotter-actuating mechanism, substantially as and for the purpose set forth.

17. The combination of the intermittingly-actuated rotary packer-shaft, the packer-arms, mechanism for actuating the packer-shaft, the packer-clutch, by which the actuating mechanism is thrown into and out of operation, the pivoted clutch-tripper arm, the tripper-engaging lugs of the clutch, and the ratchet-wheel on the packer-shaft, and its engaging-pawl having connection with and actuated by the clutch-tripping arm, substantially as and for the purpose set forth.

18. The combination of the intermittingly-actuated rotary packer-shaft, the packer-arms, mechanism for actuating the packer-shaft, the packer-clutch, by which the actuating mechanism is thrown into and out of operation, the pivoted clutch-tripping arm, the tripper-engaging lugs of the clutch, the ratchet-wheel on the packer-shaft, its engaging-pawl, and the rock-shaft carrying said pawl and actuated by the clutch-tripping arm, substantially as and for the purpose set forth.

19. The combination of the intermittingly-operated binder-actuating shaft, the main actuating-gear thereon, mechanism for continuously rotating the main actuating-gear, the clutch for engaging and disengaging said gear and shaft, the upwardly-projecting clutch-tripping lever pivotally supported at its lower end, the cranked rock-shaft having connection with the clutch-tripping lever, the link-rod connected at one end with the cranked rock-shaft, and the starting-lever with which the link-rod is connected by its opposite end, substantially as and for the purpose set forth.

20. The combination of the main actuating-shaft, its pinion, the intermittingly-operating binder-actuating shaft, the main actuating-gear thereon driven by the pinion of the main actuating-shaft, the clutch for engaging and disengaging the main actuating-gear and the binder-actuating shaft, the clutch-tripping lever, the cranked rock-shaft engaging the clutch-tripping lever, the link-rod connected at one end with the cranked rock-shaft, the starting-lever actuated by the pressure of the grain, and with which the link-rod is connected, and means to be operated by the driver for actuating the starting-lever independently of the action of the grain thereon, substantially as and for the purpose set forth.

21. The combination of the starting-lever, the endwise-moving spring-actuated lever, retracting-rod having jointed connection therewith, the bracket supporting the rod, the foot-lever with which the lever-retracting rod has jointed connection, the link-rod having jointed connection with the starting-lever, the rock-shaft to which the other end of the link-rod is jointed, the clutch-tripping lever having connection with the rock-shaft, and the clutch connecting the binder-actuating shaft and the main actuating-gear, substantially as and for the purpose set forth.

22. The combination of the starting-lever of elbow form, the lower end of which overhangs the grainway, the spring acting upon the upper arm of the elbow-lever, and the link-rod united directly with said upper arm at one end, and by connections at its other end with the clutch mechanism by which the binding mechanism is thrown into action by the upward pressure of the grain upon the starting-lever, substantially as set forth.

23. The combination of the binder-arm rock-shaft, the sleeve secured to the rock-shaft and having the stud-arm, and the segmental gear formed with and projecting in opposite directions from it, and the binder-arm adjustably secured to the stud-arm, as and for the purpose set forth.

24. The combination of the binder-arm rock-shaft, the slotted stud-arm provided with the sleeve by which it is secured to the rock-shaft and with the laterally-projecting lugs, the binder-arm, its heel-extensions jointed to the stud-arm, the flanged slotted wedge-clips, and the securing-bolt passing through the slots in the stud-arm and wedge-clips and through the binder-arm heel-extensions, substantially as set forth.

25. The combination of the compressor, its yielding shank, the curved holder to which the heel end of the shank is secured, the pinion carrying the holder, the binder-arm rock-shaft and its gear meshing with the holder-carrying pinion, substantially as and for the purpose set forth.

26. The combination of the binder-arm rock-shaft, the segmental gear thereon provided with the side lug, the vertically-moving clamp acted upon by a spring and provided with the shank acted upon by the gear-lug upon the descent of the binder-arm, and the guideway for the binding-cord, substantially as and for the purpose set forth.

27. The combination of a discharger-arm, means with which the upper end of the discharger-arm has pivotal and reciprocating supporting connection, the intermittingly-actuated rotary discharger-shaft, to a crank of which the discharger-arm is pivotally attached beneath its reciprocating and pivotal supporting connection, and driving mechanism having connection with the cranked discharger-shaft by means of a spring which yields to allow the discharger-arm to be arrested by contact with a bundle and then acts to impart a quick movement to the discharger-arm, substantially as and for the purpose set forth.

28. The combination, substantially as set forth, of the intermittingly-actuated rotary discharger-shaft, a discharger-arm having pivotal connection with a crank of this shaft, means with which the upper end of the discharger-arm has reciprocating and pivotal supporting connection above the connection between this arm and its shaft, mechanism for driving the discharger-shaft, the spring connecting said mechanism and shaft, and the compressor acting for a while on a bundle of grain in opposition to the action of the discharger-arm, and then releasing the bundle to allow of its forcible discharge by the accelerated movement imparted to the discharger-arm by the action of the spring connecting the discharger-shaft with its driving mechanism.

29. The combination of the binder-arm, its rock-shaft, the yielding vibrating compressor actuated by connection with the rock-shaft, the intermittingly-actuated rotary discharger-shaft, a discharger-arm having pivotal connection with a crank of this shaft, means with which the upper end of the discharger-arm has pivotal and reciprocating supporting connection above the connection between this arm and its shaft, mechanism for driving the discharger-shaft, the spring connecting said mechanism and shaft and the main actuating-gear by mechanism connected with which the binder-arm rock-shaft and the driving mechanism of the discharger-shaft are actuated, substantially as and for the purpose set forth.

30. The combination of the discharger-arms, the supporting-bracket overhanging the binding-table, and with which the discharger-arms have reciprocating and pivotal connection at their upper ends, the cranked discharger-shaft beneath the supporting-bracket and to the cranks of which the discharger-arms are pivoted, the pinion mounted upon the discharger-shaft, the spring yieldingly connecting the pinion and shaft, and mechanism for intermittingly actuating the pinion to rotate the discharger-shaft, substantially as and for the purpose set forth.

31. The combination of the discharger-shaft, the adjustable rocking standards, with which the rear end of the shaft has bearing connection, the pinion upon the shaft and having spring-connection therewith, the sprocket-pulley mounted on a shaft supported by the adjustable standards, its attached pinion gearing with the pinion having spring-connection with the discharger-shaft, the chain for driving said sprocket-pulley, and the intermittingly-operating binder-actuating shaft provided with the sprocket-pulley for driving the chain, substantially as and for the purpose set forth.

32. The combination of the body-section of the sectional bracket-frame, having the central and rear standards provided with the bearings for the binder-actuating shaft, the crosshead base portion at front provided with the vertical bearing, and the flanged base at rear, the front base-section of the bracket-frame having the short end posts shouldered at their corners to form seats for receiving the ends of the cross-head base portion of the body-section, and the fastening-bolts, substantially as and for the purpose set forth.

33. The combination of the standard $M^2$ of the sectional bracket-frame, the side plates having the guideway-grooves and bolted to the standard and to each other, and the bracket-arm bolted to the side plates and having the bearing $M^8$ and the bearing for the binder-arm rock-shaft, substantially as and for the purpose set forth.

34. The combination of the intermittingly-operated binder-actuating shaft, the vertically and rectilinearly reciprocating cam-yoke, the slotted yoke-slide, the guideway therefor, the wheel on the binder-actuating shaft, its face rollers acting on the cam-yoke, the binder-arm rock-shaft, and mechanism connecting this rock-shaft and the cam-yoke, substantially as and for the purpose set forth.

35. The combination of the intermittingly-operated binder-actuating shaft, the vertically-reciprocating cam-yoke, the wheel on the binder-actuating shaft, its rollers acting on the cam-yoke, the binder-arm rock-shaft, its crank, the link-rod connected with this crank, the rocking arm pivotally supported at one end and connected at its opposite end with the link-rod, and the link having connection at its opposite ends, respectively, with the cam-yoke and with the rocking arm near its connection with the link-rod, substantially as and for the purpose set forth.

36. The combination of the sectional bracket-frame, the intermittingly-operated binder-actuating shaft, the reciprocating cam-yoke, its slotted slide having guideway supporting connection with the bracket-frame, the wheel on the binder-actuating shaft, its rollers acting on the cam-yoke, the binder-arm rock-shaft, the bracket-arm in which it has bearing, and the rock-shaft crank, link-rod, rocking arm, and link constituting the toggle-like connection between the rock-shaft and cam-yoke slide, substantially as and for the purpose set forth.

37. The combination, substantially as set forth, of the main actuating-gear, the intermittingly-operating binder-actuating shaft, the clutch for connecting and disconnecting said gear and shaft, the starting mechanism for actuating the clutch to start the binder-actuating shaft, the rotary packer-shaft, the packer-arms, the packer-clutch, the packer-actuating mechanism, mechanism actuated by connection with the binder-actuating shaft for operating the packer-clutch to throw the packer-shaft out of action, with arms of the packer in position to separate the grain for binding from other grain, the binder-arm rock-shaft, and mechanism actuated by connection with the binder-actuating shaft for operating the binder-arm rock-shaft to start the binder-arm after rotation of the packer-shaft has been arrested, for the purpose described.

38. The combination of the continually-rotating main actuating-gear, the intermittingly-operated binder-actuating shaft, clutch mechanism for connecting and disconnecting the said gear and shaft, the wheel fixed on the binder-actuating shaft and having the peripheral cam-flange, the rotary packer-shaft, the sets of packer-arms, the packer-clutch mechanism provided with tripper-engaging lugs corresponding in number and relative arrangement to one another with the number and relative arrangement to one another of the arms of the respective sets of packer-arms, and mechanism for operating the packer-clutch mechanism, actuated by the cam-flange of the wheel fast on the binder-actuating shaft, substantially as and for the purpose set forth.

39. The combination, substantially as set forth, of the intermittingly-operated binder-actuating shaft, the reciprocating cam-yoke, the wheel on the binder-actuating shaft having the peripheral cam-flange, the face-rollers of the wheel acting on the cam-yoke, the binder-arm rock-shaft, mechanism connecting this rock-shaft and the cam-yoke, the packer-shaft, the packer-arms, the packer-clutch mechanism, and mechanism for operating this clutch mechanism, actuated by the cam-flange of the wheel on the binder-actuating shaft, for the purpose set forth.

40. The combination of the intermittingly-actuated rotary packer-shaft, its arms, the packer-clutch, the pivoted packer-clutch tripping-arm, the tripper-engaging lugs of the clutch, the spring-actuated reciprocating rod connected with the tripping-arm, the controlling-arm O, engaging the reciprocating rod, the roller on the controlling arm, the wheel provided with a cam for acting on said roller, and the intermittingly-operated binder-actuating shaft to which the wheel is secured, substantially as and for the purpose set forth.

41. The combination, substantially as set forth, of the main actuating-gear, the intermittingly-operating binder-actuating shaft, the clutch for connecting and disconnecting said gear and shaft, starting mechanism for actuating the clutch to start the binder-actuating shaft, the rotary packer-shaft, the packer-arms, the packer-clutch, the packer-actuating mechanism, mechanism actuated by connection with the binder-actuating shaft for operating the packer-clutch to throw the packer-shaft out of action with arms of the packer in position to separate the grain for binding from other grain, the binder-arm, its rock-shaft mechanism actuated by connection with the binder-actuating shaft for operating the binder-arm rock-shaft to start the binder-arm after rotation of the packer-shaft has been arrested, and the knotter-actuating mechanism operated by connection with the binder-actuating shaft.

In testimony whereof I have hereunto subscribed my name.

WILLIAM P. HALE.

Witnesses:
ROBERT H. STEWART,
WM. L. OSTROM.